(12) United States Patent
Peng

(10) Patent No.: US 11,509,445 B2
(45) Date of Patent: Nov. 22, 2022

(54) INFORMATION INDICATION METHOD, TERMINAL DEVICE, AND NETWORK DEVICE

(71) Applicant: VIVO MOBILE COMMUNICATION CO., LTD., Dongguan (CN)

(72) Inventor: Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 93 days.

(21) Appl. No.: 17/035,733

(22) Filed: Sep. 29, 2020

(65) Prior Publication Data

US 2021/0028913 A1 Jan. 28, 2021

Related U.S. Application Data

(63) Continuation of application No. PCT/CN2019/082210, filed on Apr. 11, 2010.

(30) Foreign Application Priority Data

Apr. 12, 2018 (CN) .......................... 201810328055.3

(51) Int. Cl.
*H04L 5/00* (2006.01)
*H04L 5/10* (2006.01)
(Continued)

(52) U.S. Cl.
CPC .......... *H04L 5/0092* (2013.01); *H04L 5/0051* (2013.01); *H04L 5/0094* (2013.01);
(Continued)

(58) Field of Classification Search
CPC ... H04L 5/0092; H04L 5/0051; H04L 5/0094; H04L 5/10; H04L 27/2607;
(Continued)

(56) References Cited

U.S. PATENT DOCUMENTS

2017/0048905 A1* 2/2017 Yun ...................... H04W 76/14
2019/0141675 A1* 5/2019 Blasco Serrano ...... H04W 4/70
(Continued)

FOREIGN PATENT DOCUMENTS

| CN | 101848544 A | 9/2010 |
|---|---|---|
| CN | 106717091 A | 5/2017 |
| CN | 110324859 A | 10/2019 |

OTHER PUBLICATIONS

First Office Action issued in related Chinese application No. 201810328055.3, dated May 7, 2020, 6 pages.
(Continued)

*Primary Examiner* — Chae S Lee
(74) *Attorney, Agent, or Firm* — IPX PLLC

(57) ABSTRACT

This disclosure discloses an information indication method, a terminal device, and a network device. The method includes determining a transmission feature parameter, where the transmission feature parameter is used to send a physical channel on a sidelink (SL), and the transmission feature parameter includes at least one of a subcarrier spacing (SCS), a cyclic prefix (CP), a bandwidth part (BWP), or a demodulation reference signal (DMRS) configuration parameter; and sending transmission feature information, where the transmission feature information is used to indicate the transmission feature parameter.

20 Claims, 5 Drawing Sheets

---

102

Determine a transmission feature parameter, where the transmission feature parameter is used to send a physical channel on a sidelink SL, and the transmission feature parameter includes at least one of a subcarrier spacing SCS, a cyclic prefix CP, a bandwidth part BWP, and a demodulation reference signal DMRS configuration parameter

104

Send transmission feature information, where the transmission feature information is used to indicate the transmission feature parameter

(51) Int. Cl.
  *H04L 27/26*     (2006.01)
  *H04W 56/00*     (2009.01)
  *H04W 72/04*     (2009.01)
  *H04W 72/12*     (2009.01)
  *H04W 92/18*     (2009.01)

(52) U.S. Cl.
  CPC ............ *H04L 5/10* (2013.01); *H04L 27/2607* (2013.01); *H04W 56/001* (2013.01); *H04W 72/0446* (2013.01); *H04W 72/0453* (2013.01); *H04W 72/1263* (2013.01); *H04W 92/18* (2013.01)

(58) Field of Classification Search
  CPC . H04L 27/26025; H04L 5/001; H04L 5/0044; H04W 56/001; H04W 72/0446; H04W 72/0453; H04W 72/1263; H04W 92/18
  See application file for complete search history.

(56) References Cited

U.S. PATENT DOCUMENTS

2019/0229964 A1*  7/2019  Ouchi ................... H04L 5/0051
2019/0327680 A1* 10/2019  Xu ....................... H04W 52/365
2020/0162228 A1*  5/2020  Gao ......................... H04L 5/10

OTHER PUBLICATIONS

NTT Docomo, Inc., "Necessity of initial DL/UL BWP in ServingCellConfig", 3GPP TSG-RAN WG2#101, R2-1803625, Mar. 2018.

Second Office Action issued in related Chinese application No. 201810328055.3, dated Aug. 18, 2020, 12 pages.

International Search Report issued in corresponding International application No. PCT/CN2019/082210, dated Jul. 11, 2019, 4 pages.

* cited by examiner

102

Determine a transmission feature parameter, where the transmission feature parameter is used to send a physical channel on a sidelink SL, and the transmission feature parameter includes at least one of a subcarrier spacing SCS, a cyclic prefix CP, a bandwidth part BWP, and a demodulation reference signal DMRS configuration parameter

104

Send transmission feature information, where the transmission feature information is used to indicate the transmission feature parameter

Configure a transmission feature parameter, where the transmission feature parameter is used to send or demodulate a physical channel on an SL, and the transmission feature parameter includes at least one of an SCS, a CP, a BWP, and a DMRS configuration parameter

204

Send transmission feature information, where the transmission feature information is used to indicate the transmission feature parameter

FIG. 2

INFORMATION INDICATION METHOD, TERMINAL DEVICE, AND NETWORK DEVICE

CROSS-REFERENCE TO RELATED APPLICATIONS

This application is a bypass continuation of PCT Application No. PCT/CN2019/082210 filed Apr. 11, 2019, which claims priority to Chinese Patent Application No. 201810328055.3, filed in China on Apr. 12, 2018, both of which are incorporated herein by reference in their entireties.

TECHNICAL FIELD

This disclosure relates to the communications field, and in particular, to an information indication method, a terminal device, and a network device.

BACKGROUND

On a sidelink (SL), a transmit end sends a physical channel on a bandwidth part (BWP) by using a specific subcarrier spacing (SCS), a cyclic prefix (CP), and a demodulation reference signal (DMRS) with a specific configuration. After receiving information from the transmit end, a receive end may demodulate the received information to obtain information sent by the transmit end.

When demodulating the information sent by the transmit end, the receive end may attempt to receive, through blind detection, the information from the transmit end by using different SCSs, CPs, and BWPs. However, in actual application, the blind detection performed by the receive end increases complexity of demodulating the information by the receive end. Consequently, efficiency of obtaining the information by the receive end is comparatively low.

SUMMARY

Embodiments of this disclosure disclose an information indication method, a terminal device, and a network device, to resolve a problem that when a transmit end demodulates, on an SL through blind detection, information sent by the receive end, complexity of demodulating the information by the receive end increases, and consequently, efficiency of obtaining the information by the receive end is comparatively low.

To resolve the foregoing technical problem, this disclosure is implemented as follows.

According to a first aspect, an information indication method is provided. The method is applied to a first terminal device and includes:

determining a transmission feature parameter, where the transmission feature parameter is used to send a physical channel on an SL, and the transmission feature parameter includes at least one of an SCS, a CP, a BWP, or a DMRS configuration parameter; and sending transmission feature information, where the transmission feature information is used to indicate the transmission feature parameter.

According to a second aspect, an information indication method is provided. The method is applied to a first terminal device and includes:

sending a physical channel on an SL based on a transmission feature parameter that is set by default, where the transmission feature parameter includes at least one of an SCS, a CP, a BWP, or a DMRS configuration parameter.

According to a third aspect, an information indication method is provided. The method is applied to a network device and includes:

configuring a transmission feature parameter, where the transmission feature parameter is used to send or demodulate a physical channel on an SL, and the transmission feature parameter includes at least one of an SCS, a CP, a BWP, or a DMRS configuration parameter; and sending transmission feature information, where the transmission feature information is used to indicate the transmission feature parameter.

According to a fourth aspect, an information indication method is provided. The method is applied to a second terminal device and includes:

receiving transmission feature information, where the transmission feature information is used to indicate a transmission feature parameter, and the transmission feature parameter includes at least one of an SCS, a CP, a BWP, or a DMRS configuration parameter; and determining the transmission feature parameter based on the transmission feature information, where the transmission feature parameter is used to demodulate a physical channel that is sent by a first terminal device on an SL.

According to a fifth aspect, an information indication method is provided. The method is applied to a second terminal device and includes:

receiving a physical channel from a first terminal device on an SL based on a transmission feature parameter that is set by default, where the transmission feature parameter includes at least one of an SCS, a CP, a BWP, or a DMRS configuration parameter.

According to a sixth aspect, a terminal device is provided. The terminal device includes:

a determining module, determining a transmission feature parameter, where the transmission feature parameter is used to send a physical channel on a SL, and the transmission feature parameter includes at least one of an SCS, a CP, a BWP, or a DMRS configuration parameter; and a sending module, sending transmission feature information, where the transmission feature information is used to indicate the transmission feature parameter.

According to a seventh aspect, a terminal device is provided. The terminal device includes:

a sending module, sending a physical channel on an SL based on a transmission feature parameter that is set by default, where the transmission feature parameter includes at least one of an SCS, a CP, a BWP, or a DMRS configuration parameter.

According to an eighth aspect, a network device is provided. The network device includes:

a configuration module, configuring a transmission feature parameter, where the transmission feature parameter is used to send or demodulate a physical channel on an SL, and the transmission feature parameter includes at least one of an SCS, a CP, a BWP, or a DMRS configuration parameter; and a sending module, sending transmission feature information, where the transmission feature information is used to indicate the transmission feature parameter.

According to a ninth aspect, a terminal device is provided. The terminal device includes:

a receiving module, receiving transmission feature information, where the transmission feature information is used to indicate a transmission feature parameter, and the transmission feature parameter includes at least one of an SCS, a CP, a BWP, or a DMRS configuration parameter; and a determining module, determining the transmission feature parameter based on the transmission feature information, where the transmission feature parameter is used to demodulate a physical channel that is sent by a first terminal device on an SL.

According to a tenth aspect, a terminal device is provided. The terminal device includes:

a receiving module, receiving a physical channel from a first terminal device on an SL based on a transmission feature parameter that is set by default, where the transmission feature parameter includes at least one of an SCS, a CP, a BWP, or a DMRS configuration parameter.

According to an eleventh aspect, a terminal device is provided. The terminal device includes: a processor, a memory, and a computer program that is stored in the memory and capable of running on the processor. When the computer program is executed by the processor, steps of the method according to the first aspect are implemented.

According to a twelfth aspect, a terminal device is provided. The terminal device includes: a processor, a memory, and a computer program that is stored in the memory and capable of running on the processor. When the computer program is executed by the processor, steps of the method according to the second aspect are implemented.

According to a thirteenth aspect, a network device is provided. The network device includes: a processor, a memory, and a computer program that is stored in the memory and capable of running on the processor. When the computer program is executed by the processor, steps of the method according to the third aspect are implemented.

According to a fourteenth aspect, a terminal device is provided. The terminal device includes: a processor, a memory, and a computer program that is stored in the memory and capable of running on the processor. When the computer program is executed by the processor, steps of the method according to the fourth aspect are implemented.

According to a fifteenth aspect, a terminal device is provided. The network device includes: a processor, a memory, and a computer program that is stored in the memory and capable of running on the processor. When the computer program is executed by the processor, steps of the method according to the fifth aspect are implemented.

According to a sixteenth aspect, a computer-readable storage medium is provided. The computer-readable storage medium stores a computer program, and when the computer program is executed by a processor, steps of the method according to the first aspect are implemented.

According to a seventeenth aspect, a computer-readable storage medium is provided. The computer-readable storage medium stores a computer program, and when the computer program is executed by a processor, steps of the method according to the second aspect are implemented.

According to an eighteenth aspect, a computer-readable storage medium is provided. The computer-readable storage medium stores a computer program, and when the computer program is executed by a processor, steps of the method according to the third aspect are implemented.

According to a nineteenth aspect, a computer-readable storage medium is provided. The computer-readable storage medium stores a computer program, and when the computer program is executed by a processor, steps of the method according to the fourth aspect are implemented.

According to a twentieth aspect, a computer-readable storage medium is provided. The computer-readable storage medium stores a computer program, and when the computer program is executed by a processor, steps of the method according to the fifth aspect are implemented.

According to the technical solutions provided in the embodiments of this disclosure, after determining the transmission feature parameter, a transmit end may send the transmission feature information on the SL, to indicate the transmission feature parameter by using the transmission feature information, where the transmission feature parameter may include at least one of the SCS, the CP, the BWP, or the DMRS configuration parameter. In this way, the terminal device and the second terminal device may obtain the at least one of the SCS, the CP, the BWP, or the DMRS configuration parameter. The first terminal sends the physical channel based on the transmission feature parameter, and the second terminal device receives the physical channel based on the transmission feature parameter. This reduces a quantity of times of blind detection performed by a receive end, and therefore can reduce complexity and a latency of demodulating the information by the receive end, and improve efficiency of obtaining the information by the receive end.

BRIEF DESCRIPTION OF DRAWINGS

The accompanying drawings described herein are used to provide further understanding of this disclosure, and constitute a part of this disclosure. Example embodiments of this disclosure and descriptions thereof are used to interpret this disclosure, but do not constitute an inappropriate limitation on this disclosure. In the drawings:

FIG. 1 is a schematic flowchart of an information indication method according to an embodiment of this disclosure;

FIG. 2 is a schematic flowchart of an information indication method according to an embodiment of this disclosure;

DETAILED DESCRIPTION

Figure 3:
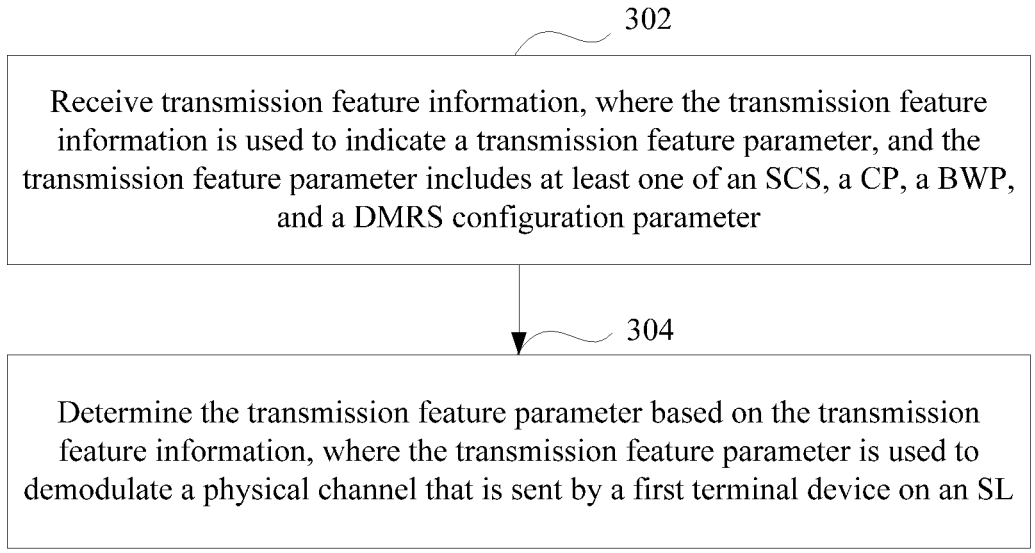
FIG. 3 is a schematic flowchart of an information indication method according to an embodiment of this disclosure.

In the related art, when sending a physical channel to a receive end on an SL, a transmit end may usually select one of a plurality of SCS, CP, BWP, and DMRS configurations for sending. For example, the transmit end may send information to the receive end by using an SCS of 15 kHz, or may send information to the receive end by using an SCS of 30 kHz; and may send information to the receive end by using a low-density DMRS, or may send information to the receive end by using a high-density DMRS.

After receiving the information from the transmit end, the receive end may demodulate the received information to obtain information sent by the transmit end. However, because an SCS, a CP, a BWP, and a DMRS used by the transmit end are not fixed, the receive end usually demodulates the received information through blind detection. For example, the receive end may demodulate the received information by using an SCS of 15 kHz. If the demodulation fails, the receive end may continue to demodulate the received information by using an SCS of 30 kHz. In this way, the receive end performs a plurality of attempts.

It can be learned that when the receive end demodulates, through blind detection, the information of the transmit end, complexity of demodulating the information by the receive end increases, and consequently, efficiency of obtaining the information by the receive end is comparatively low.

In view of this, the embodiments of this disclosure provide an information indication method, a terminal device, and a network device. When the method is applied to a first terminal device, the method includes: determining a transmission feature parameter, where the transmission feature parameter is used to send a physical channel on an SL, and the transmission feature parameter includes at least one of a SCS, a CP, a BWP, or a DMRS configuration parameter; and sending transmission feature information, where the transmission feature information is used to indicate the transmission feature parameter.

In this way, the first terminal device and the second terminal device may obtain the at least one of the SCS, the CP, the BWP, or the DMRS configuration parameter. The first terminal sends the physical channel based on the transmission feature parameter, and the second terminal device receives the physical channel based on the transmission feature parameter. This reduces a quantity of times of blind detection performed by a receive end, and therefore can reduce complexity and a latency of demodulating the information by the receive end, and improve efficiency of obtaining the information by the receive end.

The following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

The technical solutions of this disclosure may be applied to various communications systems, for example, a Global System for Mobile Communications (GSM), a Code Division Multiple Access (CDMA) system, Wideband Code Division Multiple Access (WCDMA), a General Packet Radio Service (GPRS), Long Term Evolution (LTE)/Long Term Evolution Advanced (LTE-A), and New Radio (NR).

The first terminal device may be understood as an information transmit end on the SL, and the second terminal device may be understood as an information receive end on the SL. The first terminal device and the second terminal device each may be understood as user equipment (also referred to as "User Equipment (UE)"), or may be referred to as a mobile terminal, a mobile user equipment, or the like; and may communicate with one or more core networks through, for example, a Radio Access Network (RAN). The user equipment may be a mobile terminal, for example, a mobile phone (also referred to as "cellular" phone), or a computer with a mobile terminal. For example, the user equipment may be a portable pocket-sized, handheld, computer built-in, or in-vehicle mobile apparatus. Alternatively, the user equipment may be a flight device, for example, an unmanned aerial vehicle or an aircraft, which exchanges language and/or data with the radio access network.

The network device may be understood as a core network, or may be understood as a base station. The base station may be a Base Transceiver Station (BTS) in GSM or CDMA, or may be a NodeB in WCDMA, or may be an evolved base station (eNB or e-NodeB) in LTE or a 5G base station (gNB). This is not limited in this disclosure. However, for ease of description, the following embodiments are described by using the gNB as an example.

The SL may be understood as a side link, or may be understood as a secondary link.

The following describes in detail the technical solutions provided in the embodiments of this disclosure with reference to the accompanying drawings.

FIG. 1 is a schematic flowchart of an information indication method according to an embodiment of this disclosure. The method is applied to a first terminal device, and the method is described as follows.

Step 102: Determine a transmission feature parameter, where the transmission feature parameter is used to send a physical channel on an SL, and the transmission feature parameter includes at least one of a subcarrier spacing SCS, a CP, a BWP, or a DMRS configuration parameter.

The physical channel sent on the SL may include at least one of a physical sidelink discovery channel (PSDCH), a physical sidelink control channel (PSCCH), or a physical sidelink shared channel (PSSCH); or may include another physical channel on the SL. Examples are not described one by one herein.

In step 102, the first terminal device may determine the transmission feature parameter through selection.

For example, the first terminal device may select an SCS of 15 kHz and a low-density DMRS for sending at least one of the PSCCH or the PSSCH to a second terminal device. The SCS of 15 kHz and the low-density DMRS are the determined transmission feature parameter.

It should be understood that the first terminal device may alternatively determine the transmission feature parameter in another manner. For example, the first terminal device may determine the transmission feature parameter through presetting (to be specific, use a preset transmission feature parameter as the determined transmission feature parameter); or may determine the transmission feature parameter based on a current moving speed (for example, if the current moving speed of the first terminal device is comparatively high, a comparatively large SCS or DMRS may be used). Examples are not described one by one herein.

The transmission feature parameter determined by the first terminal device may include at least one of the SCS, the CP, the BWP, or the DMRS configuration parameter. The SCS may be one of 15 kHz, 30 kHz, 60 kHz, 120 kHz, and 240 kHz. The DMRS configuration parameter may include a time-domain configuration parameter and a frequency-domain configuration parameter. The time-domain configuration parameter may include at least one of a quantity of Orthogonal Frequency Division Multiplexing (OFDM) symbols of a DMRS, or a time-domain location parameter of the DMRS. The frequency-domain configuration parameter may include at least one of a quantity of subcarriers of the DMRS, or a frequency-domain location parameter of the DMRS.

In this embodiment of this disclosure, when the first terminal device determines the transmission feature parameter, if the first terminal device sends the PSCCH, the first terminal device may determine a transmission feature parameter used for sending the PSCCH; if the first terminal device sends the PSSCH, the first terminal device may determine a transmission feature parameter used for sending the PSSCH; or if the first terminal device sends the PSDCH, the first terminal device may determine a transmission feature parameter used for sending the PSDCH. The transmission feature parameter used for sending the PSCCH, the transmission feature parameter used for sending the PSSCH, and the transmission feature parameter used for sending the PSDCH may be the same, or may be different.

The first terminal device may perform S104 after determining the transmission feature parameter.

S104: Send transmission feature information, where the transmission feature information is used to indicate the transmission feature parameter.

In step 104, the first terminal device may send the transmission feature information after determining the transmission feature parameter. The transmission feature information may be used to indicate the transmission feature parameter.

The first terminal device may send the transmission feature information through external broadcast, or may send the transmission feature information to the second terminal device. There may be one or more second terminal devices. The following embodiments of this disclosure may be described by using an example in which the transmission feature information is sent to one second terminal device.

In a first embodiment of this disclosure, the sending transmission feature information by the first terminal device may include:

sending broadcast information, where the broadcast information carries the transmission feature parameter.

In this embodiment, the first terminal device may add the transmission feature parameter to the broadcast information, and send the broadcast information to the second terminal device, to indicate the transmission feature parameter to the second terminal device by using the broadcast information.

The broadcast information may be a Master Information Block SideLink (MIB-SL), or may be a Master Information Block SideLink Vehicle To everything (MIB-SL-V2X), or may be a Physical SideLink Broadcast CHannel (PSBCH). This is not specifically limited herein.

For example, the transmission feature parameter indicated by the first terminal device is the SCS. The first terminal device may use one bit in the MIB-SL to represent the SCS. On a low frequency band, "0" may be used to represent that the SCS is 15 kHz, and "1" may be used to represent that the SCS is 30 kHz. On a high frequency band, "0" may be used to represent that the SCS is 60 kHz, and "1" may be used to represent that the SCS is 120 kHz.

For example, the transmission feature parameter indicated by the first terminal device is the SCS and the DMRS configuration parameter. The first terminal device may use two bits in the MIB-SL to represent the SCS and the DMRS configuration parameter. On a low frequency band, "00" may be used to represent that the SCS is 15 kHz and there is one DMRS symbol, "01" may be used to represent that the SCS is 15 kHz and there are two DMRS symbols, "10" may be used to represent that the SCS is 30 kHz and there are three DMRS symbols, and "11" may be used to represent that the SCS is 30 kHz and there are four DMRS symbols.

The transmission feature parameter indicated by the first terminal device to the second terminal device by using the broadcast information may be a transmission feature parameter that needs to be used for sending the PSCCH to the second terminal device on the SL, or may be a transmission feature parameter that needs to be used for sending the PSSCH to the second terminal device, or may be a transmission feature parameter that needs to be used for sending the PSCCH and the PSSCH to the second terminal device.

If the transmission feature parameter indicated by the first terminal device to the second terminal device includes the DMRS configuration parameter and at least one of the SCS, the CP, or the BWP, the DMRS configuration parameter and the at least one of the SCS, the CP, or the BWP may be separately encoded, or may be jointly encoded. This is not specifically limited herein.

In a second embodiment of this disclosure, if the first terminal device indicates the transmission feature parameter used for sending only the PSSCH to the second terminal device on the SL, the sending transmission feature information by the first terminal device may include:

sending the PSCCH, where the PSCCH carries the transmission feature parameter.

In this embodiment, the first terminal device may indicate, to the second terminal device by using the PSCCH, the transmission feature parameter used for sending the PSSCH. Specifically, when sending the PSCCH, the first terminal device may add, to the PSCCH, the transmission feature parameter used for sending the PSSCH, and send the PSCCH to the second terminal device, to indicate, to the second terminal device by using the PSCCH, the transmission feature parameter used for sending the PSSCH.

When sending the PSCCH, the first terminal device may specifically send sidelink control information (SCI). The SCI may be carried in the PSCCH.

In a third embodiment of this disclosure, the first terminal device and the second terminal device may pre-agree on a first mapping relationship between the DMRS configuration parameter and at least one of the SCS, the CP, or the BWP.

If the first terminal device indicates a transmission feature parameter including the DMRS configuration parameter to the second terminal device, when the transmission feature information is sent to the second terminal device, the transmission feature information may be used to indicate at least one of the SCS, the CP, or the BWP.

After the first terminal device sends, to the second terminal device, the transmission feature information used to indicate the at least one of the SCS, the CP, or the BWP, when receiving the indication, the second terminal device may determine, based on the first mapping relationship and the at least one of the SCS, the CP, or the BWP, the DMRS configuration parameter that corresponds to the at least one of the SCS, the CP, or the BWP. In this way, the first terminal device can indicate, to the second terminal device, the transmission feature parameter including the DMRS configuration parameter.

It can be learned that when indicating the at least one of the SCS, the CP, and the BWP to the second terminal device by using the transmission feature information, the first terminal device may also indicate the DMRS configuration parameter to the second terminal device based on the first mapping relationship. A manner of indicating the DMRS configuration parameter by the first terminal device may be considered as an implicit indication.

It should be noted that when sending, to the second terminal device, the transmission feature information used to indicate the at least one of the SCS, the CP, or the BWP, the first terminal device may use the method described in the first or second embodiment of this disclosure. This is not repeatedly described herein.

In a fourth embodiment of this disclosure, the first terminal device and the second terminal device may pre-agree on a second mapping relationship between the DMRS configuration parameter and at least one of the SCS, the CP, or the BWP. The second mapping relationship may be the same as the first mapping relationship described in the third embodiment.

If the first terminal device indicates a transmission feature parameter including the at least one of the SCS, the CP, or the BWP to the second terminal device, when the transmission feature information is sent to the second terminal device, the transmission feature information may be used to indicate the DMRS configuration parameter.

After the first terminal device sends, to the second terminal device, the transmission feature information used to indicate the DMRS configuration parameter, when receiving the indication, the second terminal device may determine, based on the second mapping relationship and the DMRS configuration parameter, the at least one of the SCS, the CP, or the BWP that corresponds to the DMRS configuration parameter. In this way, the first terminal device can indicate, to the second terminal device, the transmission feature parameter including the at least one of the SCS, the CP, or the BWP.

It can be learned that when indicating the DMRS configuration parameter to the second terminal device by using the transmission feature information, the first terminal device may also indicate the at least one of the SCS, the CP, or the BWP to the second terminal device based on the second mapping relationship. A manner of indicating the at least one of the SCS, the CP, or the BWP by the first terminal device may be considered as an implicit indication.

It should be noted that when sending, to the second terminal device, the transmission feature information used to indicate the DMRS configuration parameter, the first terminal device may use the method described in the first or second embodiment of this disclosure. This is not repeatedly described herein.

In a fifth embodiment of this disclosure, the first terminal device and the second terminal device may pre-agree on a third mapping relationship between a sequence value of a synchronization signal and the transmission feature parameter. The synchronization signal may include at least one of a Primary Sidelink Synchronization Signal (PSSS) or a Secondary Sidelink Synchronization Signal (SSSS); or may include another synchronization signal on the SL. Examples are not described one by one herein.

When the first terminal device sends the transmission feature information to the second terminal device, the transmission feature information may include the synchronization signal (or it may be understood as that the transmission feature information sent by the first terminal device is the synchronization signal).

After the first terminal device sends the transmission feature information including the synchronization signal to the second terminal device, when receiving the synchronization signal, the second terminal device may obtain the sequence value of the synchronization signal, and may determine, based on the sequence value of the synchronization signal and the third mapping relationship, the transmission feature parameter corresponding to the sequence value of the synchronization signal.

It can be learned that the first terminal device may indicate the transmission feature parameter to the second terminal device based on the third mapping relationship and by sending the transmission feature information including the synchronization signal to the second terminal device. A manner of indicating the transmission feature parameter by the first terminal device to the second terminal device by using the synchronization signal may be considered as an implicit indication.

In a sixth embodiment of this disclosure, the first terminal device and the second terminal device may pre-agree on a fourth mapping relationship between the transmission feature parameter, and time-domain locations and frequency-domain locations of broadcast information and a synchronization signal when the broadcast information and the synchronization signal are sent. The synchronization signal may include at least one of a PSSS or an SSSS, or may include another synchronization signal on the SL.

When the first terminal device sends the transmission feature information to the second terminal device, the transmission feature information may include the broadcast information and the synchronization signal (or it may be understood as that the transmission feature information sent by the first terminal device is the broadcast information and the synchronization signal).

After the first terminal device sends the transmission feature information including the broadcast information and the synchronization signal to the second terminal device, when receiving the broadcast information and the synchronization signal, the second terminal device may determine a location relationship between the broadcast information and the synchronization signal in time domain and frequency domain when the first terminal device sends the broadcast information and the synchronization signal, and may determine, based on the location relationship and the fourth mapping relationship, the transmission feature parameter corresponding to the location relationship.

It can be learned that the first terminal device may indicate the transmission feature parameter to the second terminal device based on the fourth mapping relationship and by sending the transmission feature information including the broadcast information and the synchronization signal to the second terminal device. A manner of indicating the transmission feature parameter by the first terminal device to the second terminal device by using the broadcast information and the synchronization signal may be considered as an implicit indication.

In a seventh embodiment of this disclosure, the first terminal device and the second terminal device may pre-agree on a fifth mapping relationship between the transmission feature parameter, and at least one of an SCS, a CP, a BWP, or a DMRS configuration parameter that is used by the first terminal device for sending broadcast information.

When sending the transmission feature information to the second terminal device, the first terminal device may send the broadcast information to the second terminal device. After receiving the broadcast information, the second terminal device may determine the at least one of the SCS, the CP, the BWP, or the DMRS configuration parameter that is used by the first terminal device for sending the broadcast information, and may determine, based on the fifth mapping relationship, that the first terminal device indicates the transmission feature parameter.

It can be learned that the first terminal device may indicate the transmission feature parameter to the second terminal device based on the fifth mapping relationship and by sending the broadcast information to the second terminal device. A manner of indicating the transmission feature parameter by the first terminal device to the second terminal device by using the broadcast information may be considered as an implicit indication.

In an eighth embodiment of this disclosure, the first terminal device and the second terminal device may pre-agree on a sixth mapping relationship between the transmission feature parameter, and at least one of an SCS, a CP, a BWP, or a DMRS configuration parameter that is used by the first terminal device for sending a synchronization signal. The synchronization signal may include at least one of a PSSS or an SSSS, or may include another synchronization signal on the SL.

When the first terminal device sends the transmission feature information to the second terminal device, the transmission feature information may include the synchronization signal. After receiving the synchronization signal, the second terminal device may determine the at least one of the SCS, the CP, the BWP, or the DMRS configuration parameter that is used by the first terminal device for sending the synchronization signal, and may determine, based on the sixth mapping relationship, that the first terminal device indicates the transmission feature parameter.

It can be learned that the first terminal device may indicate the transmission feature parameter to the second terminal device based on the sixth mapping relationship and by sending the synchronization signal to the second terminal device. A manner of indicating the transmission feature parameter by the first terminal device to the second terminal device by using the synchronization signal may be considered as an implicit indication.

It should be understood that the information indication methods described in the foregoing six embodiments may be combined with each other. In other words, two or more of the methods in the foregoing six embodiments may be used to indicate the transmission feature parameter to the second terminal device.

For example, the transmission feature parameter is indicated to the second terminal device by using broadcast information and a PSSCH. The first terminal device may send MIB-SL information to the second terminal device. The MIB-SL information may carry an indication of an SCS used for sending a PSCCH. For example, one bit in the MIB-SL information may be used to represent the SCS. After sending the MIB-SL information, the first terminal device may send the PSCCH to the second terminal device based on the SCS indicated in the MIB-SL. The first terminal device may add, to the PSCCH, an indication of an SCS used for sending the PSSCH. In this way, the first terminal device can indicate, to the second terminal device, the SCS used for sending the PSCCH and the SCS used for sending the PSSCH.

It should be understood that in actual application, the first terminal device may alternatively indicate the transmission feature parameter to the second terminal device in another combination manner. Examples are not described one by one herein.

In an embodiment of this disclosure, after the first terminal device sends the transmission feature information to the second terminal device according to the method described in any one or more of the foregoing embodiments, and indicates the transmission feature parameter by using the transmission feature information, the method may include:

updating the transmission feature parameter; and sending updated transmission feature information based on a specified time period, where the updated transmission feature information is used to indicate an updated transmission feature parameter.

Specifically, the transmission feature parameter determined by the first terminal device is not fixed. When changing the transmission feature parameter determined by the first terminal device in S102, the first terminal device may update the transmission feature parameter to obtain the updated transmission feature parameter.

After obtaining the updated transmission feature parameter, the first terminal device may indicate the updated transmission feature parameter to the second terminal device based on the specified time period. Specifically, the first terminal device may send transmission feature information to the second terminal device, and the transmission feature information may be used to indicate the updated transmission feature parameter. Because the transmission feature parameter indicated by the transmission feature information has changed, the transmission feature information may be understood as the updated transmission feature information.

When sending the updated transmission feature information to the second terminal device based on the specified time period, the first terminal device may use any method described in the foregoing six embodiments. This is not repeatedly described herein.

For example, the first terminal device may add the updated transmission feature parameter to broadcast information to obtain updated broadcast information, and send the updated broadcast information to the second terminal device based on the specified time period. For another example, the first terminal device may change a sequence value of a synchronization signal, and send updated transmission feature information to the second terminal device based on the specified time period, where the updated transmission feature information includes a synchronization signal with an updated sequence value.

The specified time period may be an integer multiple of a period for sending transmission feature information by the first terminal device to the second terminal device. If the transmission feature information is broadcast information, the specified time period may be an integer multiple of a period for sending broadcast information; or if the transmission feature information includes a synchronization signal, the specified time period may be an integer multiple of a period for sending a synchronization signal.

For example, the first terminal device indicates the transmission feature parameter to the second terminal device by using broadcast information. If the period for sending broadcast information by the first terminal device is T and the broadcast information carrying the transmission feature parameter is sent at a moment t0+T, when sending updated broadcast information (carrying the updated transmission feature parameter) to the second terminal device, the first terminal device may perform sending at an interval of T and at a moment t0+nT (n is an integer greater than 0) (for example, may perform sending at moments t0+2T, t0+3T, t0+4T, . . . , and t0+nT); or may perform sending at an interval of mT and at a moment t0+m*nT (both m and n are integers greater than 0) (for example, may perform sending at moments t0+2T, t0+4T, t0+6T, . . . , and t0+m*nT); or may perform sending at a moment t0+nT (n is an integer greater than 0, and may be selected randomly) (for example, may perform sending at moments t0+2T, t0+3T, t0+5T, . . . , and t0+nT).

Likewise, if the first terminal device indicates the transmission feature parameter to the second terminal device by using a synchronization signal, the period for sending a synchronization signal is T1, and the synchronization signal is sent at a moment t1+T1, when sending a synchronization signal with an updated sequence value, the first terminal device may perform sending at an interval of T1 and at a moment t1+nT1 (n is an integer greater than 0); or may perform sending at an interval of mT and at a moment t0+m*nT (both m and n are integers greater than 0); or may perform sending at a moment t0+nT (n is an integer greater than 0, and may be selected randomly).

In an embodiment of this disclosure, after the first terminal device sends the transmission feature information to the second terminal device according to the method described in any one or more of the foregoing embodiments, and indicates the transmission feature parameter by using the transmission feature information, the method may further include:

updating the transmission feature parameter based on a reference factor, where the reference factor includes at least one of a moving characteristic or a service characteristic; and sending updated transmission feature information, where the updated transmission feature information is used to indicate an updated transmission feature parameter.

In this embodiment, after indicating the transmission feature parameter to the second terminal device by using the transmission feature information, the first terminal device may update the transmission feature parameter based on the reference factor. The reference factor may be a reference factor of the first terminal device, or may be a reference factor of the first terminal device and the second terminal device. Specifically, the reference factor may include at least one of the moving characteristic or the service characteristic.

For example, the reference factor is a reference factor of the first terminal device. The moving characteristic may be a moving speed of the first terminal device, or may be geographical location information of the first terminal device, or the like. The service characteristic may be a Quality of Service (QoS) of the first terminal device, or may be a network slice.

When updating the transmission feature parameter based on the reference factor, specifically, the first terminal device may determine a reference factor preconfigured by a network device, and when the reference factor changes, may update the transmission feature parameter based on a changed reference factor.

For example, a threshold of the reference factor preconfigured by the network device is V0. When the reference factor is greater than or less than V0, the transmission feature parameter may be updated.

In this embodiment, to facilitate updating of the transmission feature parameter, a change threshold may be further preset, and when a change of the reference factor exceeds the change threshold, the transmission feature parameter is updated.

For example, a threshold of the reference factor preconfigured by the network device is V0, and the change threshold is alpha. In this case, when the reference factor is greater than V0+alpha or less than V0−alpha, the transmission feature parameter is updated (for example, when the reference factor is greater than V0+alpha, the SCS may be increased, and a density of the DMRS may be increased; or when the reference factor is less than V0−alpha, the SCS may be decreased, and a density of the DMRS may be decreased).

It should be noted that in this embodiment, after updating the transmission feature parameter based on the reference factor, the first terminal device may also indicate the updated transmission feature parameter to the second terminal device based on the specified time period described in the foregoing embodiment.

For example, when sending information to the second terminal device on a low frequency band at a moment t0+T, the first terminal device uses an SCS of 15 kHz, and a quantity of DMRSs in one slot is 2 (two DMRS symbols). At a moment t0+t1 (t1 is greater than T and less than 2T), if a moving speed v of the first terminal device increases and is greater than v0+alpha, the SCS may be changed to 30 kHz, and the quantity of DMRSs in one slot may be changed to 4. By using a period for sending a MIB-SL as a minimum granularity, the updated SCS and DMRS may be indicated to the second terminal device at a moment t0+2T.

Then, at a moment t0+t2 (t2 is greater than 2T and less than 4T), when the moving speed v of the first terminal device decreases and is less than v0−alpha, the SCS may be changed to 15 kHz, and the quantity of DMRSs in one slot may be changed to 2. By using the period for sending a MIB-SL as a minimum granularity, the updated SCS and DMRS may be indicated to the second terminal device at a moment t0+4T.

After sending the transmission feature information to the second terminal device according to the method described above, when sending the physical channel to the second terminal device on the SL, the first terminal device may perform sending by using the transmission feature parameter indicated in the transmission feature information.

According to the technical solutions provided in the embodiments of this disclosure, after determining the transmission feature parameter, a transmit end may send the transmission feature information on the SL, to indicate the transmission feature parameter by using the transmission feature information, where the transmission feature parameter may include at least one of the SCS, the CP, the BWP, or the DMRS configuration parameter. In this way, the transmit end may indicate, to a receive end, the at least one of the SCS, the CP, the BWP, or the DMRS configuration parameter that is used by the transmit end. After receiving the indication of the transmit end, the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

FIG. 2 is a schematic flowchart of an information indication method according to an embodiment of this disclosure. The information indication method is applied to a network device, and the method is described as follows.

S202: Configure a transmission feature parameter, where the transmission feature parameter is used to send or demodulate a physical channel on an SL, and the transmission feature parameter includes at least one of an SCS, a CP, a BWP, or a DMRS configuration parameter.

In step 202, the network device may preconfigure the transmission feature parameter. The transmission feature parameter may be used by a terminal device to send or demodulate the physical channel on the SL. The physical channel may include at least one of a PSDCH, a PSCCH, or a PSSCH; or may include another physical channel on the SL. Examples are not described one by one herein. The transmission feature parameter may include at least one of the SCS, the CP, the BWP, or the DMRS configuration parameter.

The SCS may be one of 15 kHz, 30 kHz, 60 kHz, 120 kHz, and 240 kHz. The DMRS configuration parameter may include a time-domain configuration parameter and a frequency-domain configuration parameter. The time-domain configuration parameter may include at least one of a quantity of OFDM symbols of the DMRS, or a time-domain location parameter of the DMRS. The frequency-domain configuration parameter may include at least one of a quantity of subcarriers of the DMRS, or a frequency-domain location parameter of the DMRS.

For example, the network device configures the SCS, the CP, the BWP, and the DMRS configuration parameter. When preconfiguring the BWP, the network device may configure an SCS size, a CP length, and a DMRS configuration parameter for each BWP.

For example, on a low frequency band, the network device may configure that: a BWP 0 uses an SCS of 15 kHz, a CP length of t1, and two DMRSs in one slot; a BWP 1 uses an SCS of 15 kHz, a CP length of t2, and two DMRSs in one slot; a BWP 2 uses an SCS of 30 kHz, a CP length of t3, and four DMRSs in one slot; and a BWP 3 uses an SCS of 30 kHz, a CP length of t4, and four DMRSs in one slot.

On a high frequency band, the network device may configure that: a BWP 0 uses an SCS of 60 kHz, a CP length of t1, and two DMRSs in one slot; a BWP 1 uses an SCS of 120 kHz, a CP length of t2, and four DMRSs in one slot; a BWP 2 uses an SCS of 60 kHz, a CP length of t3, and two DMRSs in one slot; and a BWP 3 uses an SCS of 120 kHz, a CP length of t4, and four DMRSs in one slot.

The network device may perform S204 after configuring the transmission feature parameter.

S204: Send transmission feature information, where the transmission feature information is used to indicate the transmission feature parameter.

In step 204, the network device may send the transmission feature information to the terminal device after configuring the transmission feature parameter. The transmission feature information is used to indicate the transmission feature parameter. The network device may send the transmission feature information to a first terminal device and a second terminal device, so that the first terminal device sends the physical channel on the SL based on the indication, and the second terminal device demodulates the physical channel on the SL based on the indication.

In an embodiment of this disclosure, the sending transmission feature information by the network device may include:

sending radio resource control (RRC) information, where the RRC information carries the transmission feature parameter; or sending system information block (SIB) information, where the SIB information carries the transmission feature parameter.

Specifically, after configuring the transmission feature parameter, the network device may add the transmission feature parameter to the RRC information, and indicate the transmission feature parameter to the first terminal device and the second terminal device by sending the RRC information; or the network device may add the transmission feature information to the SIB information, and indicate the transmission feature parameter to the first terminal device and the second terminal device by sending the SIB information.

In actual application, the network device may send the transmission feature information to the first terminal device and the second terminal device in either of the foregoing two manners.

After the network device sends the transmission feature information, the method may further include:

updating the transmission feature parameter; and sending updated transmission feature information, where the updated transmission feature information is used to indicate an updated transmission feature parameter.

Specifically, the transmission feature parameter preconfigured by the network device is not fixed. The network device may regularly or irregularly update the preconfigured transmission feature parameter, to obtain an updated transmission feature parameter.

After obtaining the updated transmission feature parameter, the network device may indicate the updated transmission feature parameter to the first terminal device and the second terminal device. Specifically, the network device may send, to the first terminal device and the second terminal device, transmission feature information used to indicate the updated transmission feature parameter, where the transmission feature information may be considered as the updated transmission feature information.

When sending the updated transmission feature information to the first terminal device and the second terminal device, the network device may send updated RRC information to the first terminal device and the second terminal device, where the updated RRC information carries the updated transmission feature parameter; or the network device may send updated SIB information to the first terminal device and the second terminal device, where the updated SIB information carries the updated transmission feature parameter.

In this way, after receiving the RRC information or the SIB information sent by the network device, the first terminal device and the second terminal device may obtain, from the RRC information or the SIB information, the transmission feature parameter configured by the network device.

According to the technical solutions provided in the embodiments of this disclosure, the network device may preconfigure the transmission feature parameter on the SL, and indicate the preconfigured transmission feature parameter by using the transmission feature information, where the transmission feature parameter includes at least one of the SCS, the CP, the BWP, or the DMRS configuration parameter. In this way, the network device may indicate the transmission feature information to a transmit end and a receive end, the transmit end may send information to the receive end based on the indication, and the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

FIG. 3 is a schematic flowchart of an information indication method according to an embodiment of this disclosure. The information indication method is applied to a second terminal device, and the method is described as follows.

S302: Receive transmission feature information, where the transmission feature information is used to indicate a transmission feature parameter, and the transmission feature parameter includes at least one of an SCS, a CP, a BWP, or a DMRS configuration parameter. The SCS may be one of 15 kHz, 30 kHz, 60 kHz, 120 kHz, and 240 kHz. The DMRS configuration parameter may include a time-domain configuration parameter and a frequency-domain configuration parameter. The time-domain configuration parameter may include at least one of a quantity of OFDM symbols of the DMRS, or a time-domain location parameter of the DMRS. The frequency-domain configuration parameter may include at least one of a quantity of subcarriers of the DMRS, or a frequency-domain location parameter of the DMRS.

In an embodiment of this disclosure, the receiving transmission feature information by the second terminal device may include:

receiving the transmission feature information from a first terminal device.

Specifically, after the first terminal device sends the transmission feature information to the second terminal device according to the method described in the embodiment shown in FIG. 1, the second terminal device may receive the transmission feature information from the first terminal device. The transmission feature information is used to indicate the transmission feature parameter, and the transmission feature parameter includes at least one of the SCS, the CP, the BWP, or the DMRS configuration parameter.

In another embodiment of this disclosure, the receiving transmission feature information by the second terminal device may include:

receiving the transmission feature information from a network device.

Specifically, after the network device sends the transmission feature information to the second terminal device according to the method described in the embodiment shown in FIG. 2, the second terminal device may receive the transmission feature information from the network device. The transmission feature information is used to indicate the transmission feature parameter, and the transmission feature parameter includes at least one of the SCS, the CP, the BWP, or the DMRS configuration parameter.

The receiving the transmission feature information by the second terminal device from a network device may include:

receiving RRC information from the network device, where the RRC information carries the transmission feature information; or receiving SIB information from the network device, where the SIB information carries the transmission feature information.

Specifically, if the network device adds the transmission feature information to the RRC information and sends the RRC information to the second terminal device, the second terminal device may receive the RRC information from the network device; or if the network device adds the transmission feature information to the SIB information and sends the SIB information to the second terminal device, the second terminal device may receive the SIB information from the network device.

In an embodiment of this disclosure, the receiving the transmission feature information by the second terminal device from a first terminal device may further include:

receiving updated transmission feature information from the first terminal device based on a specified time period, where the updated transmission feature information is used to indicate an updated transmission feature parameter, and the updated transmission feature parameter is obtained by the first terminal device by updating the transmission feature parameter.

Specifically, after sending the transmission feature information to the second terminal device according to the method described in the embodiment shown in FIG. 1, the first terminal device may update the transmission feature parameter according to the method described in the embodiment shown in FIG. 1, and send the updated transmission feature information to the second terminal device. The updated transmission feature information may be used to indicate the updated transmission feature parameter.

In this case, the second terminal device may receive the updated transmission feature information from the first terminal device, to update, based on the updated transmission feature information, the transmission feature parameter indicated by the first terminal device.

In another embodiment of this disclosure, the receiving the transmission feature information by the second terminal device from a network device may further include:

receiving updated transmission feature information from the network device where the updated transmission feature information is used to indicate an updated transmission feature parameter, and the updated transmission feature parameter is obtained by the network device by updating the transmission feature parameter.

Specifically, after sending the transmission feature information to the second terminal device according to the method described in the embodiment shown in FIG. 2, the network device may update the transmission feature parameter according to the method described in the embodiment shown in FIG. 2, and send the updated transmission feature information to the second terminal device. The updated transmission feature information may be used to indicate the updated transmission feature parameter.

In this case, the second terminal device may receive the updated transmission feature information from the network device, to update, based on the updated transmission feature information, the transmission feature parameter indicated by the network device. That the second terminal device may receive the updated transmission feature information from the network device may be receiving updated RRC information from the network device, where the updated RRC information carries the updated transmission feature parameter; or may be receiving updated SIB information from the network device, where the updated SIB information carries the updated transmission feature parameter.

The second terminal device may perform S304 after receiving the transmission feature information from the first terminal device or the network device.

S304: Determine the transmission feature parameter based on the transmission feature information, where the transmission feature parameter is used to demodulate a physical channel that is sent by the first terminal device on an SL.

In step 304, after receiving the transmission feature information from the first terminal device or the network device, the second terminal device may determine the transmission feature parameter based on the transmission feature information, so that the second terminal device may demodulate, based on the transmission feature parameter, the physical channel that is sent by the first terminal device on the SL. The physical channel may include at least one of a PSDCH, a PSCCH, or a PSSCH; or may include another physical channel on the SL. Examples are not described one by one herein.

In an embodiment of this disclosure, if the second terminal device receives the transmission feature information from the first terminal device, the determining the transmission feature parameter based on the transmission feature information may include:

receiving broadcast information from the first terminal device, where the broadcast information carries the transmission feature parameter; and determining the transmission feature parameter based on the broadcast information.

Specifically, the first terminal device may send the broadcast information to the second terminal device by using the method described in the embodiment shown in FIG. 1. The broadcast information may carry the transmission feature parameter. After receiving the broadcast information, the second terminal device may demodulate and analyze the broadcast information, and obtain, from the broadcast information, the transmission feature parameter carried in the broadcast information.

In this way, after receiving at least one of a PSCCH or a PSSCH from the first terminal device, the second terminal device may demodulate, based on the transmission feature parameter indicated by the first terminal device, the at least one of the PSCCH or the PSSCH that is received.

In a second embodiment of this disclosure, if the second terminal device receives the transmission feature information from the first terminal device and the transmission feature parameter is used to demodulate a PSSCH sent by the first terminal device, the determining the transmission feature parameter based on the transmission feature information may include:

receiving a PSCCH from the first terminal device, where the PSCCH carries the transmission feature parameter; and determining the transmission feature parameter based on the PSCCH.

Specifically, the first terminal device may send the PSCCH to the second terminal device by using the method described in the embodiment shown in FIG. 1. The PSCCH may carry the transmission feature parameter used to demodulate the PSSCH. After receiving the PSCCH, the second terminal device may demodulate and analyze the PSCCH, and obtain, from the PSCCH, the transmission feature parameter carried in the PSCCH.

In this way, after receiving the PSSCH from the first terminal device, the second terminal device may demodulate the PSSCH based on the transmission feature parameter indicated by the first terminal device.

In a third embodiment of this disclosure, if the second terminal device receives the transmission feature information from the first terminal device, the second terminal device and the first terminal device may pre-agree on a first mapping relationship between the DMRS configuration parameter and at least one of the SCS, the CP, or the BWP.

The transmission feature parameter indicated by the first terminal device to the second terminal device may include the DMRS configuration parameter. The transmission feature information received by the second terminal device may be used to indicate the at least one of the SCS, the CP, or the BWP.

In this case, the determining the transmission feature parameter by the first terminal device based on the transmission feature information may include: determining the transmission feature parameter based on the transmission feature information and the first mapping relationship.

Specifically, after the first terminal device sends the transmission feature information to the second terminal device according to the method described in the third embodiment shown in FIG. 1, the second terminal device may obtain the at least one of the SCS, the CP, or the BWP that is indicated by the first terminal device, and then may determine, based on the pre-agreed first mapping relationship, the DMRS configuration parameter that corresponds to the at least one of the SCS, the CP, or the BWP. In this way, the second terminal device may obtain the transmission feature parameter including the DMRS configuration parameter and the at least one of the SCS, the CP, or the BWP.

In a fourth embodiment of this disclosure, if the second terminal device receives the transmission feature information from the first terminal device, the second terminal device and the first terminal device may pre-agree on a second mapping relationship between the DMRS configuration parameter and at least one of the SCS, the CP, or the BWP.

The transmission feature parameter indicated by the first terminal device to the second terminal device may include the at least one of the SCS, the CP, or the BWP. The transmission feature information received by the second terminal device may be used to indicate the DMRS configuration parameter.

In this case, the determining the transmission feature parameter by the first terminal device based on the transmission feature information may include: determining the transmission feature parameter based on the transmission feature information and the second mapping relationship.

Specifically, after the first terminal device sends the transmission feature information to the second terminal device according to the method described in the fourth embodiment shown in FIG. 1, the second terminal device may obtain the DMRS configuration parameter that is indicated by the first terminal device, and then may determine, based on the pre-agreed second mapping relationship, the at least one of the SCS, the CP, or the BWP that corresponds to the DMRS configuration parameter. In this way, the second terminal device may obtain the transmission feature parameter including the DMRS configuration parameter and the at least one of the SCS, the CP, or the BWP.

In a fifth embodiment of this disclosure, if the second terminal device receives the transmission feature information from the first terminal device, the second terminal device and the first terminal device may pre-agree on a third mapping relationship between a sequence value of a synchronization signal and the transmission feature parameter. The synchronization signal may include at least one of a PSSS or an SSSS, or may include another synchronization signal on the SL.

The transmission feature information received by the second terminal device from the first terminal device includes the synchronization signal (or it may be understood as that the transmission feature information sent by the first terminal device is the synchronization signal). The synchronization signal includes at least one of the PSSS or the SSSS. The determining the transmission feature parameter by the second terminal device based on the transmission feature information may include: determining the transmission feature parameter based on the transmission feature information and the third mapping relationship.

Specifically, after the first terminal device sends, according to the method described in the fifth embodiment shown in FIG. 1, the transmission feature information including the synchronization signal to the second terminal device, the second terminal device may obtain the sequence value of the synchronization signal, and then may determine, based on the pre-agreed third mapping relationship, the transmission feature parameter corresponding to the sequence value of the synchronization signal. In this way, the second terminal device may obtain the transmission feature parameter by using the synchronization signal.

In a sixth embodiment of this disclosure, if the second terminal device receives the transmission feature information from the first terminal device, the second terminal device and the first terminal device may pre-agree on a fourth mapping relationship between the transmission feature parameter, and time-domain locations and frequency-domain locations of broadcast information and a synchronization signal when the broadcast information and the synchronization signal are sent. The synchronization signal may include at least one of a PSSS or an SSSS, or may include another synchronization signal on the SL.

The transmission feature information received by the second terminal device from the first terminal device may include the broadcast information and the synchronization signal (or it may be understood as that the transmission feature information sent by the first terminal device is the broadcast information and the synchronization signal).

In this case, the determining the transmission feature parameter by the first terminal device based on the transmission feature information may include: determining the transmission feature parameter based on the transmission feature information and the fourth mapping relationship.

Specifically, after the first terminal device sends, according to the method described in the sixth embodiment shown in FIG. 1, the transmission feature information including the broadcast information and the synchronization signal to the second terminal device, the second terminal device may obtain a location relationship between the broadcast information and the synchronization signal in time domain and frequency domain when the first terminal device sends the broadcast information and the synchronization signal, and then may determine, based on the pre-agreed fourth mapping relationship, the transmission feature parameter corresponding to the location relationship. In this way, the second terminal device may obtain the transmission feature parameter by using the time-domain transmit location and frequency-domain transmit location relationship between the broadcast information and the synchronization signal.

In a seventh embodiment of this disclosure, if the second terminal device receives broadcast information from the first terminal device, the second terminal device and the first terminal device may pre-agree on a fifth mapping relationship between the transmission feature parameter, and at least one of an SCS, a CP, a BWP, or a DMRS configuration parameter that is used by the first terminal device for sending the broadcast information.

After the second terminal device receives the broadcast information from the first terminal device, the determining the transmission feature parameter based on the transmission feature information may include: determining the transmission feature parameter based on the broadcast information and the fifth mapping relationship.

Specifically, after the first terminal device sends the broadcast information to the second terminal device, the second terminal device determines, by demodulating the broadcast information, the at least one of the SCS, the CP, the BWP, or the DMRS configuration parameter that is used by the first terminal device for sending the broadcast information, and the second terminal device may determine, based on the fifth mapping relationship, the transmission feature parameter corresponding to the at least one of the SCS, the CP, the BWP, or the DMRS configuration parameter that is used by the first terminal device. In this way, the second terminal device may obtain the transmission feature parameter by using the broadcast information.

In an eighth embodiment of this disclosure, if the transmission feature information received by the second terminal device from the first terminal device includes a synchronization signal, the second terminal device and the first terminal device may pre-agree on a sixth mapping relationship between the transmission feature parameter, and at least one of an SCS, a CP, a BWP, or a DMRS configuration parameter that is used by the first terminal device for sending the synchronization signal.

After the second terminal device receives the transmission feature information from the first terminal device, the determining the transmission feature parameter based on the transmission feature information may include: determining the transmission feature parameter based on the transmission feature information and the sixth mapping relationship.

Specifically, after the first terminal device sends the transmission feature information to the second terminal device, the second terminal device determines, by demodulating the transmission feature information, the at least one of the SCS, the CP, the BWP, or the DMRS configuration parameter that is used by the first terminal device for sending the synchronization signal, and the second terminal device may determine, based on the sixth mapping relationship, the transmission feature parameter corresponding to the at least one of the SCS, the CP, the BWP, or the DMRS configuration parameter that is used by the first terminal device. In this way, the second terminal device may obtain the transmission feature parameter by using the synchronization signal.

If the second terminal device receives the transmission feature information from the network device according to the method described in S302, the second terminal device may obtain, from the RRC information or the SIB information, the transmission feature parameter configured by the network device.

After determining the transmission feature parameter based on the transmission feature information and receiving the at least one of the PSCCH or the PSSCH from the first terminal device on the SL, the second terminal device may demodulate, based on the determined transmission feature parameter, the at least one of the PSCCH or the PSSCH that is received, to avoid blind detection and improve information obtaining efficiency.

According to the technical solutions provided in the embodiments of this disclosure, after receiving the transmission feature information on the SL, a receive end determines the transmission feature parameter indicated by the transmission feature information, where the transmission feature parameter may include at least one of the SCS, the CP, the BWP, or the DMRS configuration parameter. In this way, after receiving the information of a transmit end, the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

In an embodiment of this disclosure, a same transmission feature parameter may be alternatively set for the first terminal device and the second terminal device by default. For example, when being delivered out of a factory, the first terminal device and the second terminal device may have a transmission feature parameter that is set by default. The transmission feature parameter includes at least one of an SCS, a CP, a BWP, or a DMRS configuration parameter. The transmission feature parameter may be used by the first terminal device for sending a physical channel to the second terminal device on an SL, and used by the second terminal device for demodulating the physical channel sent by the first terminal device on the SL. The physical channel may include at least one of a PSDCH, a PSCCH, or a PSSCH; or may include another physical channel on the SL.

In this way, the same transmission feature parameter is set for the first terminal device and the second terminal device, so that when sending information to the second terminal device, the first terminal device may perform sending based on the transmission feature parameter that is set by default. After receiving the information from the first terminal device, the second terminal device may perform demodulation by using the transmission feature parameter that is set by default. This reduces a quantity of times of blind detection performed by the second terminal device, and therefore can reduce complexity and a latency of demodulating the information by the second terminal device, and improve efficiency of obtaining the information by the second terminal device.

It should be noted that the transmission feature parameter that is set for the first terminal device and the second terminal device by default is not fixed. After the first terminal device or the network device updates the transmission feature parameter and indicates an updated transmission feature parameter to the second terminal device according to the method described in the embodiment shown in FIG. 1 or FIG. 2, the updated transmission feature parameter may overwrite the transmission feature parameter that is set for the first terminal device and the second terminal device by default. In this case, the first terminal device and the second terminal device may transmit information by using the updated transmission feature parameter.

The foregoing describes specific embodiments of this specification. Other embodiments fall within the scope of the claims. In some cases, the actions or the steps described in the foregoing embodiments may be performed in a sequence different from that in the embodiments but still implement an expected result. In addition, a process shown in the accompanying drawings does not necessarily require a specific sequence or a consecutive sequence for implementing an expected result. In some implementations, multitask processing and parallel processing are also allowed, or may be advantageous.

Figure 4:
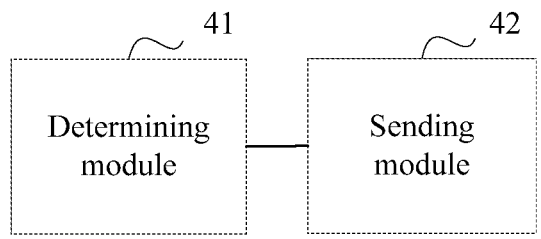
FIG. 4 is a schematic structural diagram of a terminal device according to an embodiment of this disclosure.

FIG. 4 is a schematic structural diagram of a terminal device according to an embodiment of this disclosure. The terminal device includes a determining module 41 and a sending module 42.

The determining module 41 determines a transmission feature parameter, where the transmission feature parameter is used to send a physical channel on an SL, and the transmission feature parameter includes at least one of a SCS, a CP, a BWP, or a DMRS configuration parameter.

The sending module 42 sends transmission feature information, where the transmission feature information is used to indicate the transmission feature parameter.

Optionally, the sending transmission feature information by the sending module 42 includes:

sending broadcast information, where the broadcast information carries the transmission feature parameter.

Optionally, the transmission feature parameter is used to send a PSSCH on the SL; and the sending transmission feature information by the sending module 42 includes:

sending PSCCH, where the PSCCH carries the transmission feature parameter.

Optionally, the transmission feature parameter includes the DMRS configuration parameter, the transmission feature information is used to indicate at least one of the SCS, the CP, or the BWP, and the at least one of the SCS, the CP, or the BWP has a first mapping relationship with the DMRS configuration parameter.

Optionally, the transmission feature parameter includes at least one of the SCS, the CP, or the BWP, the transmission feature information is used to indicate the DMRS configuration parameter, and the at least one of the SCS, the CP, or the BWP has a second mapping relationship with the DMRS configuration parameter.

Optionally, the transmission feature information includes a synchronization signal, and a sequence value of the synchronization signal has a third mapping relationship with the transmission feature parameter.

Optionally, the transmission feature information includes broadcast information and a synchronization signal, and a time-domain transmit location and frequency-domain transmit location relationship between the broadcast information and the synchronization signal has a fourth mapping relationship with the transmission feature parameter.

Optionally, the sending transmission feature information by the sending module 42 includes:

sending broadcast information, where at least one of an SCS, a CP, a BWP, or a DMRS configuration parameter that is used by the first terminal device for sending the broadcast information has a fifth mapping relationship with the transmission feature parameter.

Optionally, the transmission feature information includes a synchronization signal, and at least one of an SCS, a CP, a BWP, or a DMRS configuration parameter that is used by the first terminal device for sending the synchronization signal has a sixth mapping relationship with the transmission feature parameter.

Optionally, the first terminal device further includes a first update module 43.

After the sending module 42 sends the transmission feature information, the first update module 43 updates the transmission feature parameter; and the sending module 42 sends updated transmission feature information based on a specified time period, where the updated transmission feature information is used to indicate an updated transmission feature parameter.

Optionally, the first terminal device further includes a second update module 44.

After the sending module 42 sends the transmission feature information, the second update module 44 updates the transmission feature parameter based on a reference factor, where the reference factor includes at least one of a moving characteristic or a service characteristic; and the sending module 42 sends updated transmission feature information, where the updated transmission feature information is used to indicate an updated transmission feature parameter.

The terminal device provided in this embodiment of this disclosure can implement various processes that are implemented by the first terminal device in the method embodiment of FIG. 1. To avoid repetition, details are not described herein again. In this embodiment of this disclosure, after determining the transmission feature parameter, a transmit end may send the transmission feature information on the SL, to indicate the transmission feature parameter by using the transmission feature information, where the transmission feature parameter may include at least one of the SCS, the CP, the BWP, or the DMRS configuration parameter. In this way, the transmit end may indicate, to a receive end, the at least one of the SCS, the CP, the BWP, or the DMRS configuration parameter that is used by the transmit end. After receiving the indication of the transmit end, the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

Figure 5:
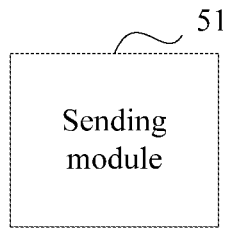
FIG. 5 is a schematic structural diagram of a terminal device according to an embodiment of this disclosure.

FIG. 5 is a schematic structural diagram of a terminal device according to an embodiment of this disclosure. The terminal device includes a sending module 51.

The sending module 51 sends a physical channel on an SL based on a transmission feature parameter that is set by default, where the transmission feature parameter includes at least one of an SCS, a CP, a BWP, or a DMRS configuration parameter.

In this embodiment of this disclosure, a same transmission feature parameter is set for a transmit end and a receive end, so that when sending information to the receive end, the transmit end may perform sending based on the transmission feature parameter that is set by default. After receiving the information from the transmit end, the receive end may perform demodulation by using the transmission feature parameter that is set by default. This reduces a quantity of times of blind detection performed by the receive end, and therefore can reduce complexity and a latency of demodulating the information by the receive end, and improve efficiency of obtaining the information by the receive end.

Figure 6:
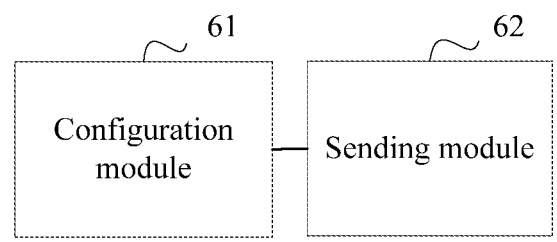
FIG. 6 is a schematic structural diagram of a network device according to an embodiment of this disclosure.

FIG. 6 is a schematic structural diagram of a network device according to an embodiment of this disclosure. The network device includes a configuration module 61 and a sending module 62.

The configuration module 61 configuring a transmission feature parameter, where the transmission feature parameter is used to send or demodulate a physical channel on an SL, and the transmission feature parameter includes at least one of an SCS, a CP, a BWP, or a DMRS configuration parameter.

The sending module 62 sends transmission feature information, where the transmission feature information is used to indicate the transmission feature parameter.

Optionally, the network device further includes an update module 63.

The update module 63 updates the transmission feature parameter; and the sending module 62 sends updated transmission feature information, where the updated transmission feature information is used to indicate an updated transmission feature parameter.

Optionally, the sending transmission feature information by the sending module 62 includes:
sending RRC information, where the RRC information carries the transmission feature parameter; or
sending SIB information, where the SIB information carries the transmission feature parameter.

The terminal device provided in this embodiment of this disclosure can implement various processes that are implemented by the network device in the method embodiment of FIG. 2. To avoid repetition, details are not described herein again. In this embodiment of this disclosure, the network device may preconfigure the transmission feature parameter on the SL, and indicate the preconfigured transmission feature parameter by using the transmission feature information, where the transmission feature parameter includes at least one of the SCS, the CP, the BWP, or the DMRS configuration parameter. In this way, the network device may indicate the transmission feature information to a transmit end and a receive end, the transmit end may send information to the receive end based on the indication, and the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

Figure 7:
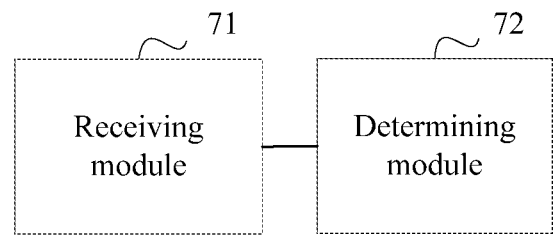
FIG. 7 is a schematic structural diagram of a terminal device according to an embodiment of this disclosure.

FIG. 7 is a schematic structural diagram of a terminal device according to an embodiment of this disclosure. The terminal device includes a receiving module 71 and a determining module 72.

The receiving module 71 receives transmission feature information, where the transmission feature information is used to indicate a transmission feature parameter, and the transmission feature parameter includes at least one of an SCS, a CP, a BWP, or a DMRS configuration parameter.

The determining module 72 determines the transmission feature parameter based on the transmission feature information, where the transmission feature parameter is used to demodulate a physical channel that is sent by a first terminal device on an SL.

Optionally, the receiving transmission feature information by the receiving module 71 includes:
receiving the transmission feature information from the first terminal device.

Optionally, the determining the transmission feature parameter by the determining module 72 based on the transmission feature information includes:
receiving broadcast information from the first terminal device, where the broadcast information carries the transmission feature parameter; and
determining the transmission feature parameter based on the broadcast information.

Optionally, the transmission feature parameter is used to demodulate a PSSCH sent by the first terminal device; and
the determining the transmission feature parameter by the determining module 72 based on the transmission feature information includes:
receiving a PSCCH from the first terminal device, where the PSCCH carries the transmission feature parameter; and
determining the transmission feature parameter based on the PSCCH.

Optionally, the transmission feature parameter includes the DMRS configuration parameter, and the transmission feature information is used to indicate at least one of the SCS, the CP, or the BWP; and
the determining the transmission feature parameter by the determining module 72 based on the transmission feature information includes:
determining the transmission feature parameter based on the transmission feature information and a first mapping relationship, where the first mapping relationship is a mapping relationship between the DMRS configuration parameter and the at least one of the SCS, the CP, or the BWP.

Optionally, the transmission feature parameter includes at least one of the SCS, the CP, or the BWP, and the transmission feature information is used to indicate the DMRS configuration parameter; and
the determining the transmission feature parameter by the determining module 72 based on the transmission feature information includes:
determining the transmission feature parameter based on the transmission feature information and a second mapping relationship, where the second mapping relationship is a mapping relationship between the DMRS configuration parameter and the at least one of the SCS, the CP, or the BWP.

Optionally, the transmission feature information includes a synchronization signal; and
the determining the transmission feature parameter by the determining module 72 based on the transmission feature information includes:
determining the transmission feature parameter based on the transmission feature information and a third mapping relationship, where the third mapping relationship is a mapping relationship between a sequence value of the synchronization signal and the transmission feature parameter.

Optionally, the transmission feature information includes broadcast information and a synchronization signal; and
the determining the transmission feature parameter by the determining module 72 based on the transmission feature information includes:
determining the transmission feature parameter based on the transmission feature information and a fourth mapping relationship, where the fourth mapping relationship is a mapping relationship between the transmission feature parameter and a time-domain transmit location and frequency-domain transmit location relationship between the broadcast information and the synchronization signal.

Optionally, the receiving module 71 receives broadcast information from the first terminal device; and the determining the transmission feature parameter by the determining module 72 based on the transmission feature information includes:

determining the transmission feature parameter based on the broadcast information and a fifth mapping relationship, where the fifth mapping relationship is a mapping relationship between the transmission feature parameter, and at least one of an SCS, a CP, a BWP, or a DMRS configuration parameter that is used by the first terminal device for sending the broadcast information.

Optionally, the transmission feature information includes a synchronization signal; and the determining the transmission feature parameter by the determining module 72 based on the transmission feature information includes:

determining the transmission feature parameter based on the transmission feature information and a sixth mapping relationship, where the sixth mapping relationship is a mapping relationship between the transmission feature parameter, and at least one of an SCS, a CP, a BWP, or a DMRS configuration parameter that is used by the first terminal device for sending the synchronization signal.

Optionally, the receiving transmission feature information by the receiving module 71 from the first terminal device includes:

receiving updated transmission feature information from the first terminal device based on a specified time period, where the updated transmission feature information is used to indicate an updated transmission feature parameter, and the updated transmission feature parameter is obtained by the first terminal device by updating the transmission feature parameter.

Optionally, the receiving the transmission feature information by the receiving module 71 includes:

receiving the transmission feature information from a network device.

Optionally, the receiving transmission feature information by the receiving module 71 from the network device includes:

receiving updated transmission feature information from the network device where the updated transmission feature information is used to indicate an updated transmission feature parameter, and the updated transmission feature parameter is obtained by the network device by updating the transmission feature parameter.

Optionally, the receiving transmission feature information by the receiving module 71 from the network device includes:

receiving RRC information from the network device, where the RRC information carries the transmission feature information; or receiving SIB information from the network device, where the SIB information carries the transmission feature information.

The terminal device provided in this embodiment of this disclosure can implement various processes that are implemented by the network device in the method embodiment of FIG. 3. To avoid repetition, details are not described herein again. In this embodiment of this disclosure, after receiving the transmission feature information on the SL, a receive end determines the transmission feature parameter indicated by the transmission feature information, where the transmission feature parameter may include at least one of the SCS, the CP, the BWP, or the DMRS configuration parameter. In this way, after receiving the information of a transmit end, the receive end may demodulate the received information based on the indication. This reduces a quantity of times of blind detection performed by the receive end, and therefore can reduce complexity and a latency of demodulating the information by the receive end, and improve efficiency of obtaining the information by the receive end.

Figure 8:
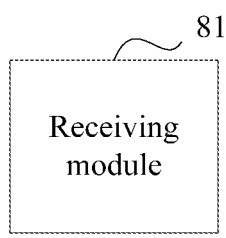
FIG. 8 is a schematic structural diagram of a terminal device according to an embodiment of this disclosure.

FIG. 8 is a schematic structural diagram of a terminal device according to an embodiment of this disclosure. The terminal device includes a receiving module 81.

The receiving module 81 receives a physical channel from a first terminal device on an SL based on a transmission feature parameter that is set by default, where the transmission feature parameter includes at least one of an SCS, a CP, a BWP, or a DMRS configuration parameter.

In this embodiment of this disclosure, a same transmission feature parameter is set for a transmit end and a receive end, so that when sending information to the receive end, the transmit end may perform sending based on the transmission feature parameter that is set by default. After receiving the information from the transmit end, the receive end may perform demodulation by using the transmission feature parameter that is set by default. This reduces a quantity of times of blind detection performed by the receive end, and therefore can reduce complexity and a latency of demodulating the information by the receive end, and improve efficiency of obtaining the information by the receive end.

Figure 9:
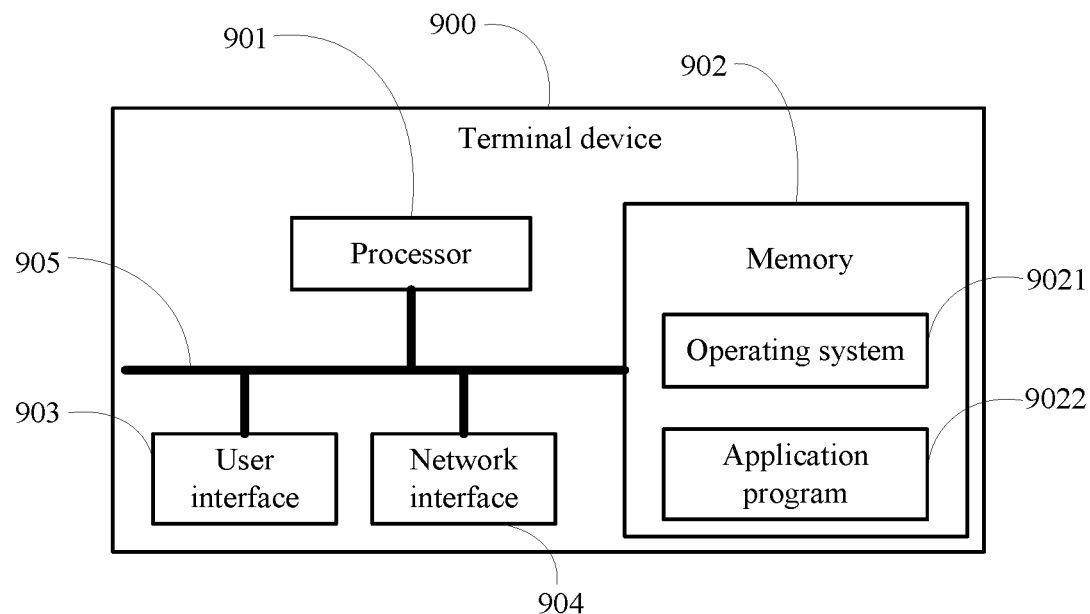
FIG. 9 is a schematic structural diagram of a terminal device according to an embodiment of this disclosure.

In the embodiments of this disclosure, a communications device may include a network device, a first terminal device, and a second terminal device. When the communications device is the first terminal device, FIG. 9 is a schematic structural diagram of a terminal device according to an embodiment of this disclosure. The terminal device 900 shown in FIG. 9 includes: at least one processor 901, a memory 902, at least one network interface 904, and a user interface 903. Various components in the terminal device 900 are coupled together by using a bus system 905. It may be understood that the bus system 905 is used to implement a connection and communication between these components. In addition to a data bus, the bus system 905 further includes a power bus, a control bus, and a status signal bus. However, for clarity of description, various buses in FIG. 9 are marked as the bus system 905.

The user interface 903 may include a display, a keyboard, or a pointing device (for example, a mouse, a trackball (trackball), a touch panel, or a touchscreen).

It may be understood that the memory 902 in this embodiment of this disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which serves as an external cache. As an example but not limitative description, RAMs in many forms may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a SynchLink DRAM (SLDRAM), and a Direct Rambus RAM (DRRAM). The memory 902 for the system and the method described in the embodiments of this disclosure is intended to include but is not limited to these and any other proper types of memories.

In some implementations, the memory 902 stores the following elements, executable modules, or data structures, or their subsets, or their extension sets: an operating system 9021 and an application program 9022.

The operating system 9021 includes various system programs, for example, a framework layer, a core library layer, and a driver layer, which are used to implement various basic services and process hardware-based tasks. The application program 9022 includes various application programs, for example, a Media Player and a Browser, which are used to implement various application services. A program for implementing the method in the embodiments of this disclosure may be included in the application program 9022.

In this embodiment of this disclosure, the terminal device 900 further includes a computer program that is stored in the memory 902 and capable of running on the processor 901. When the computer program is executed by the processor 901, the following steps are implemented:

determining a transmission feature parameter, where the transmission feature parameter is used to send a physical channel on an SL, and the transmission feature parameter includes at least one of an SCS, a CP, a BWP, or a DMRS configuration parameter; and sending transmission feature information, where the transmission feature information is used to indicate the transmission feature parameter.

Alternatively, the following steps are implemented:

sending a physical channel on an SL based on a transmission feature parameter that is set by default, where the transmission feature parameter includes at least one of an SCS, a CP, a BWP, or a DMRS configuration parameter.

The method disclosed in the foregoing embodiment of this disclosure may be applied to the processor 901 or implemented by the processor 901. The processor 901 may be an integrated circuit chip with a signal processing capability. In an implementation process, the steps of the foregoing method may be performed by using an integrated logic circuit of hardware in the processor 901 or an instruction in a form of software. The processor 901 may be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The processor 901 may implement or perform the methods, the steps, and the logical block diagrams that are disclosed in the embodiments of this disclosure. The general purpose processor may be a microprocessor, or the processor may be any conventional processor or the like. The steps of the method disclosed with reference to the embodiments of this disclosure may be directly performed by a hardware decoding processor, or may be performed by a combination of hardware and software modules in a decoding processor. The software module may be located in a mature computer-readable storage medium in the art, for example, a random access memory, a flash memory, a read-only memory, a programmable read-only memory, an electrically erasable programmable memory, or a register. The computer-readable storage medium is located in the memory 902. The processor 901 reads information in the memory 902, and performs the steps of the foregoing method in combination with hardware of the processor 901. Specifically, the computer-readable storage medium stores a computer program, and when the computer program is executed by the processor 901, the steps in the foregoing embodiments of the information indication method are implemented.

It may be understood that these embodiments described in the embodiments of this disclosure may be implemented by hardware, software, firmware, middleware, microcode, or a combination thereof. For a hardware implementation, a processing unit may be implemented in one or more ASICs, a DSP, a DSP Device (DSPD), a Programmable Logic Device (PLD), an FPGA, a general purpose processor, a controller, a microcontroller, a microprocessor, another electronic unit used for performing the functions described in this disclosure, or a combination thereof.

For a software implementation, the technologies described in the embodiments of this disclosure may be implemented by using a module for performing the functions described in the embodiments of this disclosure. Software code may be stored in a memory and executed by a processor. The memory may be implemented inside the processor or outside the processor.

The terminal device 900 can implement various processes that are implemented by the terminal device in the foregoing embodiments. To avoid repetition, details are not described herein again.

An embodiment of this disclosure further proposes a computer-readable storage medium. The computer-readable storage medium stores one or more programs. The one or more programs include an instruction. When the instruction is executed by a communications device including a plurality of application programs, the communications device can be enabled to perform the method in the embodiment shown in FIG. 1, and may be specifically configured to perform the steps of the information indication method described above.

Figure 10:
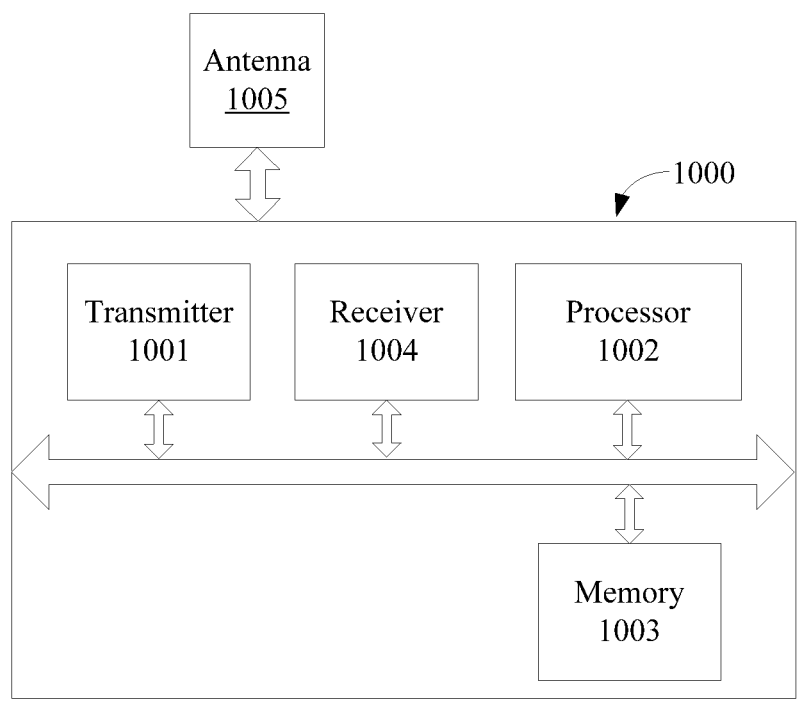
FIG. 10 is a schematic structural diagram of a network device according to an embodiment of this disclosure.

When the communications device is the network device, FIG. 10 is a schematic structural diagram of a network device according to an embodiment of this disclosure. A schematic structural diagram of an entity apparatus of the network device 1000 may be shown in FIG. 10. The network device 1000 includes a processor 1002, a memory 1003, a transmitter 1001, and a receiver 1004. In actual application, the transmitter 1001 and the receiver 1004 may be coupled to an antenna 1005.

The memory 1003 is configured to store a program. Specifically, the program may include program code, and the program code includes a computer operation instruction. The memory 1003 may include a read-only memory and a random access memory, and provide an instruction and data for the processor 1002. The memory 1003 may include a high-speed RAM memory, or may include a non-volatile memory (non-volatile memory), for example, at least one magnetic disk memory.

The processor 1002 executes the program stored in the memory 1003.

Specifically, in the network device 1000, the processor 1002 may perform the following method:

configuring a transmission feature parameter, where the transmission feature parameter is used to send or demodulate a physical channel on an SL, and the transmission feature parameter includes at least one of an SCS, a CP, a BWP, or a DMRS configuration parameter; and sending transmission feature information, where the transmission feature information is used to indicate the transmission feature parameter.

The method that is disclosed in the embodiment shown in FIG. 2 of this disclosure and that is performed by the network device 1000 may be applied to the processor 1002 or implemented by the processor 1002. The processor 1002 may be an integrated circuit chip with a signal processing capability. In an implementation process, the steps of the foregoing method may be performed by using an integrated logic circuit of hardware in the processor 1002 or an instruction in a form of software. The processor 1002 may be a general purpose processor, including a Central Processing Unit CPU) or a Network Processor (NP); or may be a DSP, an ASIC, an FPGA or another programmable logic device, a discrete gate or transistor logic device, or a discrete hardware component. The processor 1002 may implement or perform the methods, the steps, and the logical block diagrams that are disclosed in the embodiments of this disclosure. The general purpose processor may be a microprocessor, or the processor may be any conventional processor or the like. The steps of the method disclosed with reference to the embodiments of this disclosure may be directly performed by a hardware decoding processor, or may be performed by a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory 1003. The processor 1002 reads information in the memory 1003, and performs the steps of the foregoing method in combination with hardware of the processor 1002.

The network device may further perform the method shown in FIG. 2, and implement the functions of the network device in the embodiment shown in FIG. 2. Details are not described herein again in this embodiment of this disclosure.

An embodiment of this disclosure further proposes a computer-readable storage medium. The computer-readable storage medium stores one or more programs. The one or more programs include an instruction. When the instruction is executed by a communications device including a plurality of application programs, the communications device can be enabled to perform the method in the embodiment shown in FIG. 2, and may be specifically configured to perform the steps of the information indication method described above.

Figure 11:
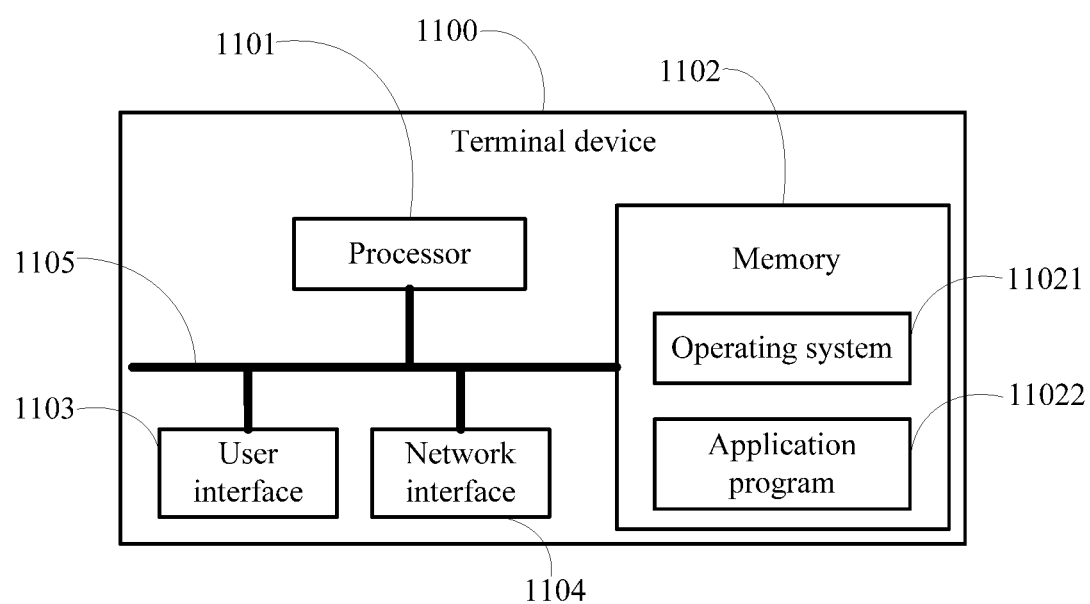
FIG. 11 is a schematic structural diagram of a terminal device according to an embodiment of this disclosure.

When the communications device is the second terminal device, FIG. 11 is a schematic structural diagram of a terminal device according to an embodiment of this disclosure. The terminal device 1100 shown in FIG. 11 includes: at least one processor 1101, a memory 1102, at least one network interface 1104, and a user interface 1103. Various components in the mobile terminal 1100 are coupled together by using a bus system 1105. It may be understood that the bus system 1105 is used to implement a connection and communication between these components. In addition to a data bus, the bus system 1105 further includes a power bus, a control bus, and a status signal bus. However, for clarity of description, various buses in FIG. 11 are marked as the bus system 1105.

The user interface 1103 may include a display, a keyboard, or a pointing device (for example, a mouse, a trackball (trackball), a touch panel, or a touchscreen).

It may be understood that the memory 1102 in this embodiment of this disclosure may be a volatile memory or a non-volatile memory, or may include both a volatile memory and a non-volatile memory. The non-volatile memory may be a (ROM, a PROM, an EPROM, an EEPROM, or a flash memory. The volatile memory may be a RAM, which serves as an external cache. As an example but not limitative description, RAMs in many forms may be used, for example, an SRAM, a DRAM, an SDRAM, a DDRSDRAM, an ESDRAM, a SLDRAM, and a DRRAM. The memory 902 for the system and the method described in the embodiments of this disclosure is intended to include but is not limited to these and any other proper types of memories.

In some implementations, the memory 1102 stores the following elements, executable modules, or data structures, or their subsets, or their extension sets: an operating system 11021 and an application program 11022.

The operating system 11021 includes various system programs, for example, a framework layer, a core library layer, and a driver layer, which are used to implement various basic services and process hardware-based tasks. The application program 11022 includes various application programs, for example, a media player (Media Player) and a browser (Browser), which are used to implement various application services. A program for implementing the method in the embodiments of this disclosure may be included in the application program 11022.

In this embodiment of this disclosure, the terminal device 1100 further includes a computer program that is stored in the memory 1102 and capable of running on the processor 1101. When the computer program is executed by the processor 1101, the following steps are implemented:

receiving transmission feature information, where the transmission feature information is used to indicate a transmission feature parameter, and the transmission feature parameter includes at least one of an SCS, a CP, a BWP, or a DMRS configuration parameter; and determining the transmission feature parameter based on the transmission feature information, where the transmission feature parameter is used to demodulate a physical channel that is sent by a first terminal device on an SL.

Alternatively, the following steps are implemented:

receiving a physical channel from a first terminal device on an SL based on a transmission feature parameter that is set by default, where the transmission feature parameter includes at least one of an SCS, a CP, a BWP, or a DMRS configuration parameter.

The method disclosed in the foregoing embodiment of this disclosure may be applied to the processor 1001 or implemented by the processor 1001. The processor 1001 may be an integrated circuit chip with a signal processing capability. In an implementation process, the steps of the foregoing method may be performed by using an integrated logic circuit of hardware in the processor 1001 or an instruction in a form of software. The processor 1001 may be a general purpose processor, a DSP, an ASIC, a FPGA or another programmable logic device, a discrete gate or transistor logic device, or a discrete hardware component. The processor 1001 may implement or perform the methods, the steps, and the logical block diagrams that are disclosed in the embodiments of this disclosure. The general purpose processor may be a microprocessor, or the processor may be any conventional processor or the like. The steps of the method disclosed with reference to the embodiments of this disclosure may be directly performed by a hardware decoding processor, or may be performed by a combination of hardware and software modules in a decoding processor. The software module may be located in a mature computer-readable storage medium in the art, for example, a random access memory, a flash memory, a read-only memory, a programmable read-only memory, an electrically erasable programmable memory, or a register. The computer-readable storage medium is located in the memory 1002. The processor 1001 reads information in the memory 1002, and performs the steps of the foregoing method in combination with hardware of the processor 1001. Specifically, the computer-readable storage medium stores a computer program, and when the computer program is executed by the processor 1001, the steps in the foregoing embodiments of the information indication method are implemented.

It may be understood that these embodiments described in the embodiments of this disclosure may be implemented by hardware, software, firmware, middleware, microcode, or a combination thereof. For a hardware implementation, a processing unit may be implemented in one or more ASICs, a DSP, a DSPD, a PLD, a FPGA, a general purpose processor, a controller, a microcontroller, a microprocessor, another electronic unit used for performing the functions described in this disclosure, or a combination thereof.

For a software implementation, the technologies described in the embodiments of this disclosure may be implemented by using a module for performing the functions described in the embodiments of this disclosure. Software code may be stored in a memory and executed by a processor. The memory may be implemented inside the processor or outside the processor.

The terminal device 1100 can implement various processes that are implemented by the second terminal device in the foregoing embodiments. To avoid repetition, details are not described herein again.

An embodiment of this disclosure further proposes a computer-readable storage medium. The computer-readable storage medium stores one or more programs. The one or more programs include an instruction. When the instruction is executed by a communications device including a plurality of application programs, the communications device can be enabled to perform the method in the embodiment shown in FIG. 3, and may be specifically configured to perform the steps of the information indication method described above.

To sum up, the foregoing descriptions are merely exemplary embodiments of this disclosure, but are not intended to limit the protection scope of this disclosure. Any modification, equivalent replacement, or improvement made within the spirit and principle of this disclosure shall fall within the protection scope of this disclosure.

The system, apparatus, module, or unit described in the foregoing embodiments may be specifically implemented by a computer chip or an entity, or implemented by a product with a specific function. A typical implementation device is a computer. Specifically, for example, the computer may be a personal computer, a laptop computer, a cellular phone, a camera phone, a personal digital assistant, a media player, a navigation device, an email device, a game console, a tablet computer, a wearable device, or a combination of any of these devices.

Computer-readable media include persistent, non-persistent, movable, and non-movable media, and may store information by using any method or technology. The information may be a computer-readable instruction, a data structure, a program module, or other data. For example, computer storage media include but are not limited to a phase-change random access memory (PRAM), a static random access memory (SRAM), a DRAM, another type of RAM, a ROM, an EEPROM, a flash memory stick or another memory technology, a compact disc read-only memory (CD-ROM), a digital versatile disc (DVD) or another optical storage, a cassette, a magnetic tape, a magnetic disk storage, another magnetic storage device, or any other non-transmission medium, and may be configured to store information accessible to a computing device. According to the demarcation in this specification, the computer-readable media do not include computer-readable transitory media (transitory media), for example, a modulated data signal and carrier.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the implementations, a person skilled in the art may clearly understand that the method in the foregoing embodiments may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disk), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely examples, and do not constitute a limitation. Inspired by this disclosure, a person of ordinary skill in the art can make many variations without departing from the essence of this disclosure or the protection scope of the claims. All these variations shall fall within the protection scope of this disclosure.

What is claimed is:

1. An information indication method, performed by a first terminal device, comprising:
  receiving transmission feature parameter from a network device, wherein the transmission feature parameter is used to send a physical channel by the first terminal device to a second terminal device on a sidelink (SL), and the transmission feature parameter comprises demodulation reference signal (DMRS) configuration parameter, wherein the DMRS configuration parameter includes a time-domain configuration parameter and a frequency-domain configuration parameter, wherein the time-domain configuration parameter includes at least one of a quantity of Orthogonal Frequency Division Multiplexing (OFDM) symbols of the DMRS or a time-domain location parameter of the DMRS, wherein the frequency-domain configuration parameter includes at least one of a quantity of subcarriers of the DMRS or a frequency-domain location parameter of the DMRS; and
  sending the transmission feature information to the second terminal device for the second terminal device to demodulate the physical channel.

2. The information indication method according to claim 1, wherein the transmission feature parameter is used to send a physical sidelink shared channel (PSSCH) on the SL; and
  the sending the transmission feature information to the second terminal device comprises:
  sending a physical sidelink control channel (PSCCH) to the second terminal device, wherein the PSCCH carries the transmission feature parameter.

3. The information indication method according to claim 1, wherein
  the transmission feature information comprises at least one of a subcarrier spacing (SCS), a cyclic prefix (CP), or a bandwidth part (BWP), and at least one of the SCS, the CP, or the BWP has a first mapping relationship with the DMRS configuration parameter to enable the second terminal device to determine the DMRS configuration parameter from the at least one of the SCS, the CP, or the BWP;

or, the transmission feature parameter further comprises at least one of the SCS, the CP, or the BWP, the transmission feature information comprises the DMRS configuration parameter, and the at least one of the SCS, the CP, or the BWP has a second mapping relationship with the DMRS configuration parameter to enable the second terminal device to determine the at least one of the SCS, the CP, or the BWP from the DMRS configuration parameter;

or, the transmission feature information comprises a synchronization signal, and a sequence value of the synchronization signal has a third mapping relationship with the transmission feature parameter to enable the second terminal device to determine the transmission feature parameter from the synchronization signal;

or, the transmission feature information comprises broadcast information and a synchronization signal, and a time-domain transmit location and frequency-domain transmit location relationship between the broadcast information and the synchronization signal has a fourth mapping relationship with the transmission feature parameter to enable the second terminal device to determine the transmission feature parameter from the time-domain transmit location and frequency-domain transmit location relationship.

4. The information indication method according to claim 1, wherein the sending the transmission feature information to a second terminal device comprises:

sending broadcast information to the second terminal device, wherein at least one of an SCS, a CP, a BWP, or the DMRS configuration parameter that is used by the first terminal device for sending the broadcast information has a fifth mapping relationship with the transmission feature parameter to enable the second terminal device to determine the transmission feature parameter from the at least one of the SCS, the CP, the BWP, or the DMRS configuration parameter.

5. The information indication method according to claim 1, wherein the transmission feature information comprises a synchronization signal, and at least one of an SCS, a CP, a BWP, or the DMRS configuration parameter that is used by the first terminal device for sending the synchronization signal has a sixth mapping relationship with the transmission feature parameter to enable the second terminal device to determine the transmission feature parameter from the at least one of the SCS, the CP, the BWP, or the DMRS configuration parameter.

6. The information indication method according to claim 1, wherein after the sending the transmission feature information to a second terminal device, the method further comprising:

updating the transmission feature parameter; and
sending updated transmission feature information based on a specified time period, wherein the updated transmission feature information is used to indicate the updated transmission feature parameter.

7. The information indication method according to claim 1, wherein after the sending the transmission feature information to a second terminal device, the method further comprising:

updating the transmission feature parameter based on a reference factor, wherein the reference factor comprises at least one of a moving characteristic or a service characteristic; and sending updated transmission feature information, wherein the updated transmission feature information is used to indicate the updated transmission feature parameter.

8. An information indication method for information received from a first terminal device, performed by a second terminal device, comprising:

receiving transmission feature information, wherein the transmission feature information is used to indicate a transmission feature parameter, and the transmission feature parameter comprises demodulation reference signal (DMRS) configuration parameter; and determining the transmission feature parameter based on the transmission feature information, wherein the transmission feature parameter is used to demodulate a physical channel that is sent by the first terminal device to the second terminal device on a sidelink (SL), wherein the DMRS configuration parameter includes a time-domain configuration parameter and a frequency-domain configuration parameter, wherein the time-domain configuration parameter includes at least one of a quantity of Orthogonal Frequency Division Multiplexing (OFDM) symbols of the DMRS or a time-domain location parameter of the DMRS, wherein the frequency-domain configuration parameter includes at least one of a quantity of subcarriers of the DMRS or a frequency-domain location parameter of the DMRS.

9. The information indication method according to claim 8, wherein the receiving transmission feature information comprises:

receiving the transmission feature information from the first terminal device.

10. The information indication method according to claim 9, wherein the transmission feature parameter is used to demodulate a physical sidelink shared channel (PSSCH) sent by the first terminal device; and the determining the transmission feature parameter based on the transmission feature information comprises:

receiving a physical sidelink control channel (PSCCH) from the first terminal device, wherein the PSCCH carries the transmission feature parameter; and determining the transmission feature parameter based on the PSCCH.

11. The information indication method according to claim 9, wherein the transmission feature information comprises at least one of a subcarrier spacing (SCS), a cyclic prefix (CP), or a bandwidth part (BWP), and the determining the transmission feature parameter based on the transmission feature information comprises:

determining the transmission feature parameter based on the transmission feature information and a first mapping relationship, wherein the first mapping relationship is a mapping relationship between the DMRS configuration parameter and the at least one of the SCS, the CP, or the BWP to enable the second terminal device to determine the DMRS configuration parameter from the at least one of the SCS, the CP, or the BWP;

or, the transmission feature parameter further comprises at least one of the SCS, the CP, or the BWP, and the transmission feature information comprises the DMRS configuration parameter, and the determining the transmission feature parameter based on the transmission feature information comprises:

determining the transmission feature parameter based on the transmission feature information and a second mapping relationship, wherein the second mapping relationship is a mapping relationship between the DMRS configuration parameter and the at least one of the SCS, the CP, or the BWP to enable the second terminal device to determine the at least one of the SCS, the CP, or the BWP from the DMRS configuration parameter; or, the transmission feature information comprises a synchronization signal, and the determining the transmission feature parameter based on the transmission feature information comprises:

determining the transmission feature parameter based on the transmission feature information and a third mapping relationship, wherein the third mapping relationship is a mapping relationship between a sequence value of the synchronization signal and the transmission feature parameter to enable the second terminal device to determine the transmission feature parameter from the synchronization signal; or, the transmission feature information comprises broadcast information and a synchronization signal, and the determining the transmission feature parameter based on the transmission feature information comprises:

determining the transmission feature parameter based on the transmission feature information and a fourth mapping relationship, wherein the fourth mapping relationship is a mapping relationship between the transmission feature parameter and a time-domain transmit location and frequency-domain transmit location relationship between the broadcast information and the synchronization signal to enable the second terminal device to determine the transmission feature parameter from the time-domain transmit location and frequency-domain transmit location relationship.

12. The information indication method according to claim 9, wherein broadcast information is received from the first terminal device; and the determining the transmission feature parameter based on the transmission feature information comprises:

determining the transmission feature parameter based on the broadcast information and a fifth mapping relationship, wherein the fifth mapping relationship is a mapping relationship between the transmission feature parameter, and at least one of an SCS, a CP, a BWP, or the DMRS configuration parameter that is used by the first terminal device for sending the broadcast information to enable the second terminal device to determine the transmission feature parameter from the at least one of the SCS, the CP, the BWP, or the DMRS configuration parameter.

13. The information indication method according to claim 9, wherein the transmission feature information comprises a synchronization signal; and the determining the transmission feature parameter based on the transmission feature information comprises:

determining the transmission feature parameter based on the transmission feature information and a sixth mapping relationship, wherein the sixth mapping relationship is a mapping relationship between the transmission feature parameter, and at least one of an SCS, a CP, a BWP, or the DMRS configuration parameter that is used by the first terminal device for sending the synchronization signal to enable the second terminal device to determine the transmission feature parameter from the at least one of the SCS, the CP, the BWP, or the DMRS configuration parameter.

14. The information indication method according to claim 9, wherein the receiving the transmission feature information from the first terminal device comprises:

receiving updated transmission feature information from the first terminal device based on a specified time period, wherein the updated transmission feature information is used to indicate an updated transmission feature parameter, and the updated transmission feature parameter is obtained by the first terminal device by updating the transmission feature parameter.

15. A first terminal device, comprising:

a processor configured to:

receive transmission feature parameter from a network device, wherein the transmission feature parameter is used to send a physical channel by the first terminal device to a second terminal device on a sidelink (SL), and the transmission feature parameter comprises demodulation reference signal (DMRS) configuration parameter, wherein the DMRS configuration parameter includes a time-domain configuration parameter and a frequency-domain configuration parameter, wherein the time-domain configuration parameter includes at least one of a quantity of Orthogonal Frequency Division Multiplexing (OFDM) symbols of the DMRS or a time-domain location parameter of the DMRS, wherein the frequency-domain configuration parameter includes at least one of a quantity of subcarriers of the DMRS or a frequency-domain location parameter of the DMRS; and send the transmission feature information to the second terminal device for the second terminal device to demodulate the physical channel.

16. The first terminal device according to claim 15, wherein the transmission feature parameter is used to send a physical sidelink shared channel (PSSCH) on the SL; and the send the transmission feature information to a second terminal device comprises:

send a physical sidelink control channel (PSCCH), wherein the PSCCH carries the transmission feature parameter.

17. The first terminal device according to claim 15, wherein the transmission feature information comprises at least one of a subcarrier spacing (SCS), a cyclic prefix (CP), or a bandwidth part (BWP), and at least one of the SCS, the CP, or the BWP has a first mapping relationship with the DMRS configuration parameter to enable the second terminal device to determine the DMRS configuration parameter from the at least one of the SCS, the CP, or the BWP;

or, the transmission feature parameter further comprises at least one of the SCS, the CP, or the BWP, the transmission feature information comprises the DMRS configuration parameter, and the at least one of the SCS, the CP, or the BWP has a second mapping relationship with the DMRS configuration parameter to enable the second terminal device to determine the at least one of the SCS, the CP, or the BWP from the DMRS configuration parameter;

or, the transmission feature information comprises a synchronization signal, and a sequence value of the synchronization signal has a third mapping relationship with the transmission feature parameter to enable the second terminal device to determine the transmission feature parameter from the synchronization signal;

or, the transmission feature information comprises broadcast information and a synchronization signal, and a time-domain transmit location and frequency-domain transmit location relationship between the broadcast information and the synchronization signal has a fourth mapping relationship with the transmission feature parameter to enable the second terminal device to determine the transmission feature parameter from the time-domain transmit location and frequency-domain transmit location relationship.

18. The first terminal device according to claim 15, wherein the processor further be configured to:

send broadcast information to the second terminal device, wherein at least one of an SCS, a CP, a BWP, or the DMRS configuration parameter that is used by the first terminal device for sending the broadcast information has a fifth mapping relationship with the transmission feature parameter to enable the second terminal device to determine the transmission feature parameter from the at least one of the SCS, the CP, the BWP, or the DMRS configuration parameter.

19. The first terminal device according to claim 15, wherein the transmission feature information comprises a synchronization signal, and at least one of an SCS, a CP, a BWP, or the DMRS configuration parameter that is used by the first terminal device for sending the synchronization signal has a sixth mapping relationship with the transmission feature parameter to enable the second terminal device to determine the transmission feature parameter from the at least one of the SCS, the CP, the BWP, or the DMRS configuration parameter.

20. The first terminal device according to claim 15, wherein the processor further be configured to:

update the transmission feature parameter; and send updated transmission feature information based on a specified time period, wherein the updated transmission feature information is used to indicate the updated transmission feature parameter.

* * * * *